(12) United States Patent
Chappell et al.

(10) Patent No.: US 10,070,657 B1
(45) Date of Patent: Sep. 11, 2018

(54) METHOD AND SYSTEM FOR CONTROLLING A LOIN PULLER MEAT PROCESSING MACHINE

(71) Applicant: Hall Fabrication, Inc., Henderson, NV (US)

(72) Inventors: Dave Chappell, Las Vegas, NV (US); Scott Bruce, Knoxville, TN (US)

(73) Assignee: Hall Fabrication, Inc., Henderson, NV (US)

( * ) Notice: Subject to any disclaimer, the term of this patent is extended or adjusted under 35 U.S.C. 154(b) by 201 days.

(21) Appl. No.: 15/210,332

(22) Filed: Jul. 14, 2016

Related U.S. Application Data

(60) Provisional application No. 62/192,209, filed on Jul. 14, 2015.

(51) Int. Cl.
| | | |
|---|---|---|
| *A22C 17/00* | (2006.01) | |
| *A22B 5/00* | (2006.01) | |
| *G05B 19/05* | (2006.01) | |

(52) U.S. Cl.
CPC ........ *A22C 17/0046* (2013.01); *A22B 5/0035* (2013.01); *G05B 19/056* (2013.01); *G05B 2219/13004* (2013.01); *G05B 2219/13144* (2013.01)

(58) Field of Classification Search
CPC .............. A22C 17/0006; A22C 17/004; A22C 17/0046; A22B 5/00
USPC .................................................. 452/149, 171
See application file for complete search history.

(56) References Cited

U.S. PATENT DOCUMENTS

| | | | |
|---|---|---|---|
| 5,580,306 A | 12/1996 | Young et al. | |
| 6,089,968 A | 7/2000 | Andre et al. | |
| 6,104,966 A * | 8/2000 | Haagensen | A22B 5/007 |
| | | | 221/1 |
| 6,336,856 B1 | 1/2002 | Dufour et al. | |
| 6,547,658 B2 * | 4/2003 | Boody | A22B 5/0035 |
| | | | 452/134 |
| 7,052,388 B2 | 5/2006 | Houtz | |
| 7,118,471 B2 | 10/2006 | Chappell et al. | |
| 7,207,880 B2 * | 4/2007 | Bruce | A22B 5/0035 |
| | | | 452/171 |
| 7,214,129 B2 | 5/2007 | Couture et al. | |
| 7,226,350 B1 | 6/2007 | Chappell | |
| 7,331,850 B2 * | 2/2008 | Roy | A22B 5/0005 |
| | | | 452/171 |
| 7,354,339 B2 | 4/2008 | Chappell et al. | |

(Continued)

*Primary Examiner* — Richard Thomas Price, Jr.
(74) *Attorney, Agent, or Firm* — McKee, Voorhees & Sease, PLC

(57) ABSTRACT

A method and system for adjusting operation of a meat processing machine on the floor of a meat processing plant which is controlled by a PLC away from the machine. An operator at the meat processing machine is provided a digital display of pre-selected operating parameters related to the meat processing machine. The operator can adjust one or more of the pre-selected operation parameters on the display. The adjustments are communicated to the PLC, allowing real-time control of a remotely positioned PLC to minimize need of operator to have to physically walk between machine and the PLC in a remote room. In one form, the communications are via IP protocol between a web-server at the PLC and the portable digital display on a web-enabled tablet computer.

20 Claims, 19 Drawing Sheets

(56) References Cited

U.S. PATENT DOCUMENTS

| | | | |
|---|---|---|---|
| 7,404,759 B2 * | 7/2008 | Sato | A22B 5/0041 |
| | | | 452/157 |
| 7,523,083 B2 | 4/2009 | Bromley et al. | |
| 7,756,966 B2 | 7/2010 | Callaghan | |
| 7,841,264 B2 * | 11/2010 | Kim | B26D 3/10 |
| | | | 452/156 |
| 7,857,686 B2 * | 12/2010 | Arnason | A22C 25/166 |
| | | | 452/161 |
| 7,918,718 B2 * | 4/2011 | Christensen | A22B 5/007 |
| | | | 452/157 |
| 8,096,860 B2 * | 1/2012 | Bolte | A22C 17/002 |
| | | | 452/157 |
| 8,190,274 B2 | 5/2012 | Konieczny et al. | |
| 8,292,702 B2 * | 10/2012 | Bolte | A22B 5/165 |
| | | | 452/134 |
| 9,039,498 B2 * | 5/2015 | Schwarz | A22C 25/08 |
| | | | 452/127 |
| 2007/0275647 A1 | 11/2007 | Eger | |
| 2011/0046754 A1 | 2/2011 | Bromley et al. | |

\* cited by examiner

```
← → C  [ 🌐 192.168.2. 76.800/****        ☆ ⬇
```

Loinpuller 1 JBlade Default Setting

Default JBlade Delay Initial Up=
MODIFY =[0        ] [Set Value]

Default JBlade First Delay=
MODIFY =[75       ] [Set Value]

Default JBlade First Up=
MODIFY =[0        ] [Set Value]

Default JBlade Second Delay=
MODIFY =[75       ] [Set Value]

Default JBlade Second Up=
MODIFY =[0        ] [Set Value]

Default JBlade Down Delay=
MODIFY =[50       ] [Set Value]

Default JBlade Down Delay=
MODIFY =[200      ] [Set Value]

Default JBlade Out Delay=
MODIFY =[250      ] [Set Value]

FIG. 11F

METHOD AND SYSTEM FOR CONTROLLING A LOIN PULLER MEAT PROCESSING MACHINE

CROSS-REFERENCE TO RELATED APPLICATIONS

This application claims the benefit of Provisional Application U.S. Ser. No. 62/192,209 filed on Jul. 14, 2015, all of which is herein incorporated by reference in its entirety.

I. BACKGROUND OF THE INVENTION

A. Overview

The present invention pertains to control of a loin puller system in the meat processing technological arts and, in particular, to an improved operator control of certain components of an automated loin puller system.

B. Problems in the Art

Examples of loin puller systems are disclosed at U.S. Pat. Nos. 7,118,471; 7,226,350; and 7,354,339, commonly-owned by the owner of the present invention, and incorporated by reference herein in their entireties. A plurality of mechanically-actuated knife or cutting blades (in one type of loin puller referred to as "J" and "Z" blades) remove excess fat and the belly loin area of an animal carcass which moves on a conveyor past cutting devices. Automated systems avoid the human resources needed for manual loin pulling and promote increased throughput of carcasses and yield of desirable cuts from the carcasses.

Automated systems use settings to control the mechanized functions of the system, such as conveyance of the carcasses to the loin pulling station, starting and stop of blades, setting the blades' cutting positions relative a carcass, and stepping the carcass through the loin pulling process. The above-cited patents show and explain types of cutting blades and other components for automated loin pulling systems, as well as the type of and variety of adjustments that can be made to blade operation.

Examples of other automated loin pulling systems can be seen at U.S. Pat. Nos. 6,089,968; 6,547,658; 6,336,856; and 7,214,129, each incorporated by reference herein in their entireties. They give further details about automated loin pulling machines and systems, and the variety of components and adjustments possible. Such systems are automated by using electro-mechanical or electronic sensors to acquire information about the status of loin pulling operations at the machine. The sensed information is communicated to a controller. The controller compares the sensed information to reference settings or profiles, and can instruct machine setting adjustments if an offset between sensors and current settings. Additionally, a trained operator can monitor the machine or the sensed information and, if deemed needed, instruct adjustments which are communicated to components at the loin puller machine.

FIG. 1A illustrates one commercially available loin puller 10. Conveyor belt 12 moves carcasses serially to and through a cutting station 14 where one or more blades 16 separate portions of the carcasses. The separated pieces are moved to an outlet 18 by the conveyor for further processing. FIG. 1B is a close-up view of a control panel 20 on loin puller 10. As can be seen, there are a number of different controls that allow manual adjustment to be made right at machine 10. A seasoned operator could make educated adjustments at machine 10.

Although automated systems can increase throughput and profit because of less human labor and the ability to operate continuously, even relatively small deviations from ideal cuts of each carcass can be detrimental. For example, typical meat processing plants run multiple loin pullers concurrently across two worker shifts each 24 hour day. If, for example, four loin pullers are operated those two 12 hour shifts/day, with each machine averaging 2600 carcasses/hour, as little as a 0.3 inch deviation from an ideal cut can translate into millions of dollars of lost value in the end product per year. Published U.S. patent application US2007/0275647, incorporated by reference herein in its entirety, discusses how small variances in cutting can affect quality, and thus value, of the meat.

FIGS. 2A and 2B are illustrations of a typical meat processing plant 30. A number of steps and stations are required, beginning with entry of live animals, euthanizing, skin removal, and then on to various meat cutting operations; which can vary depending on animal type. A typical plant floor plan can occupy tens of thousands of square feet, and be quite crowded with conveyors, machines, and other structures. While each station has its function, and can be individually controlled, the object is to have the entire plant run in a complementary fashion for best efficiency. A slow-down at one station can slow the entire through-put of plant 30.

Therefore, a variety of attempts have been made to help improve coordination and throughput. Some address overall plant coordination. Others address each station or operations. A variety of computerized monitoring systems have been developed. Because computers or other controllers can be sensitive to dirt, debris, vibrations, water, and other environmental conditions, they are typically housed in a central enclosed office, protected from the sometimes harsh environment on the meat processing floor; harsh at least relative to typical electronic or computer equipment. FIG. 3 gives one example of such a central, enclosed and protected office 40 with a variety of control equipment (e.g. computers 48, programmable logic controllers (PLCs) 42, and the like) hard-wired to various machines and components out on the floor. Supervisory workers can monitor the various stations and machines from office 40.

For example, automated loin pullers 10 out on the floor can be hardwire connected to office 40. As indicated in FIGS. 4A, 4B and 4C, dedicated PLCs 42 in office 40 can be programmed to automatically operate each loin puller 10 to adjust each carcass and carcass variable to promote the best end product cuts.

One approach to automated loin pullers is to utilize sensors 44 (see, e.g., FIGS. 4A, 4B and 4C for several different examples) at each loin puller 10 to estimate such things as dimensions of a carcass and amount of back fat, and then feedback such information to a controller 42. The controller 42 can compare the sensor data to the loin puller settings and automatically instruct any adjustments to the cutting components (via switches 47 and actuators 46) indicated from the sensors 44. This can be done remotely from the protected office 40 instead of at machine 10. The PLCs 42 can be programmed to instruct operation of electromechanical loin puller components (e.g. hydraulic or electric valves, motors, etc.) according to designed profiles or operator control. U.S. Pat. No. 5,580,306, incorporated by reference herein in its entirety, discloses a version of an automated loin puller with a controller and various adjustable components, inputs, and outputs.

One example of programming of a loin puller PLC is shown at FIG. 5. A PLC or computer in office can store a variety of pre-designed loin puller profiles that instruct different machine adjustments. The profiles can allow the PLC to have a ready-made set of different machine settings correlated to different animal carcass characteristics. Such is well-known in this technical art. If the sensors at the machine feedback certain data, the PLC chooses the best pre-designed profile.

As discussed above, computers and PLCs can have difficulty reliably operating in harsh environments like those at meat processing equipment. Such equipment and surrounding areas must be frequently washed down for hygienic and waste removal purposes. This can be antithetical to electronic devices. As is well-appreciated in this technical field, if the PLC or computer fails to operate, and needed automatic adjustments are not made, losses on value of the resulting meat accumulate even over relatively short periods of time.

Thus, one solution is to place the computer equipment in the separate isolated control room 40 with protected environment in order to promote the chance for continuous and accurate operation. However, as can be appreciated with reference to FIGS. 2A, 2B, and 3, office 40 is remote from loin pullers 10 in the sense it is separated from at least several to tens of meters from loin pullers 10. This has created a dilemma regarding optimal operation of loin pullers 10.

An operator or supervisor inside office 40 will have immediate access to PLCs 42 and any display or user interface associated with them in office 40. However, if an issue occurs out on the floor at or with machines 10, the operator or supervisor may not become aware of it immediately and/or must either guess on any adjustments to make and instruct them at the PLC 42 in office 40, or must leave office 40, walk to machine 10, make a decision and return to office 40 to make any adjustments.

On the other hand, an operator or supervisor at loin puller 10 cannot see any display or user interface at PLC 42 in office 40 or its present operating parameters or adjustments. Therefore, the operator or supervisor out on the floor cannot know if the controller is indicating issues or whether something else. To check on the PLC 42 and any display and human-machine interface (HMI) at PLC 42, the operator must leave loin puller 10, walk sometimes substantial distances (e.g. many meters if not tens of meters), and enter office 40.

In either of the above cases, there is an inevitable time-delay for the person to move between machine 10 and office 40. And it is typical that only certain persons with authority can make machine adjustments.

In a plant with four loin pullers 10, it is not unusual that each puller 10 must be adjusted an average of four times per shift. Because of the time-lag caused by having to travel to and from office 40, many times this can involve an hour of time per machine per shift to make adjustments and check if they are fixed. One example of a problem is misalignment of cutting blades causing rib bone damage. Such damage can cause each loin to be devalued by $6 to $10. At one hour of such damage per four machines at 1300 pieces a machine, this can result in losses of tens of thousands of dollars an hour per shift.

It was typical for the PLC 42 or its components to be on the floor at pullers 10. However, it has been found that failure rate is high. Downtime for the controller of pullers 10 can either put the pullers 10 out of commission (which might also disrupt plant throughput), or require that processing continue with the wrong settings. Either case might involve similar or more monetary losses than discussed above. Therefore, most systems place the PLCs and associated user interfaces in the remote protected office 40.

PLCs and sensing at machines such as pullers 10 continues to advance. For example, the types and comprehensiveness of sensors at pullers 10 expand. FIGS. 4A-C and the above-mentioned patents give some examples. There can be ultrasound, machine-vision, and other high technology monitoring. Also, machines 10 themselves can feedback all sorts of other information. As mentioned above, a number of variables and factors exist regarding loin pulling. For example, sensors can lose calibration or be affected by the harsh conditions at the machine. Other components of the system may cause cutting deviations even if the sensors and computers are working. It has been found that workers may have to fix such problems multiple times per day for each machine. The trend is for more and more monitoring and information, including interfacing with other intelligent devices (e.g. computer 48) for additional controls, information, and options. This tends to require more and more training for operators. It also makes the systems and user interfaces more and more complex.

Thus, the state of the art is a robust PLC with user interface for monitoring all sorts of loin puller states and statuses in the protected remote office, and a worker (e.g. supervisor) with adjustment authority walking between pullers 10 on the plant floor, as well as between pullers 10 and office 40 multiple times per hour to adjust machines 10. This provides a wealth of information and control at the PLC 42, substantial security by limiting access to authorized personnel, and protects the substantial investment in the controllers and related equipment, all with the goal of conducting effective and efficient operation of pullers 10 out on the floor, as one part of the larger meat processing plant.

However, as indicated above, there is room for improvement with automated loin pullers and a need for improvement in this technical art has been identified.

II. SUMMARY OF THE INVENTION

It is therefore an object, feature, aspect, or advantage of the present invention to present a control option for automated loin puller machines which improves on or overcomes problems in the state of the art.

Further objects, features, aspects, or advantages of the present invention include apparatus, systems, and methods as above described, which:
  a. enable indirect local control of specific loin puller adjustments even though the direct control of the loin pullers is in a remote protected environment;
  b. ensure only authorized personnel have the ability to make such local adjustments;
  c. pre-designs the critical subset of adjustments available for local control;
  d. provides the ability to locally control plural loin pullers from a single portable device;
  e. economically allows addition of the local control to both existing and new PLC-controlled automated loin puller systems;
  f. allows the PLC control to maintain its complete set of monitoring and control functions;
  g. deters reduction in value of end product from the loin pullers;
  h. promotes more efficient and effective loin pulling;

i. provides portability, agility, and quick response time for needed adjustments;

j. if change-out of the local control device is needed, it does not require interruption of the loin pulling operation for any of the machines; and k. deters time lag between loin puller adjustments deemed needed by authorized personnel.

The solution of the invention is to give an authorized worker real-time control of a subset of specific meat processing machine adjustments at or near the meat processing machine which are communicated to a remotely positioned PLC. This minimizes the need of worker to have to physically move between the machine and the PLC in a remote room to make any of the subset of specific adjustments. The subset of adjustments are designed to cover the adjustments typically needed during normal machine operating times. Thus, the worker does not need the entire PLC functionality or user interface at the machine. This allows the worker to quickly and efficiently make the typical adjustments needed in essentially real-time.

In one aspect of the invention, an automated loin machine on a meat processing floor includes a variety of components under PLC control that relate to loin pulling. A PLC in a remote protected room or office has software and programmability to regulate the loin puller components by hardwire back at the loin puller machine. A portable web-enabled digital device, such as a tablet computer which includes wireless communication capability, can be carried by an authorized operator at and about the loin puller machine or machines, such as exist in a particular meat processing plant. A webserver and wireless router operably connected at the PLC provides a wireless communications link to the portable device. Using IP protocol, the portable device can require initialization with a user name and password to ensure authorization, and then display to the authorized operator a set of webpage-based displays with a specific subset of control parameters. The control parameters are selected to provide the operator with critical machine adjustments, but not all possible adjustments or information that the PLC needs to operate right at the loin puller. The user selects the number of adjustments and profiles needed or desired. Thus, there is no standard setting. The profiles may be timing functions throughout the machine operation. There can be separate screens for the J-Blade and for the Z-blade. There can also be a separate screen directed to troubleshooting. Specific profiles can be saved, such as Monday morning start-up to accommodate meat products that have hardened over the weekend from an extra day in the cooler. Moreover, the portable device allows the same or similar control of all loin pullers on the floor from that single device. Thus, the authorized worker has a high level of portability, mobility, and agility in the crowded, noisy, and busy floor environment. Additionally, because it is an adjunct, indirect, and supplemental control, if any issues with the portable device occur, the machine(s) continue to run under direct PLC control and do not need to be shut down. A substitute portable device can readily by used.

In another aspect of the invention, a method of controlling a set of loin pulling machines on the floor of a meat processing plant comprises web-enabling a portable digital device with wireless capability, displaying on the portable device a pre-selected menu of loin puller operating parameters from an overall set of loin puller operating parameters, allowing an operator at or near any of the loin pulling machines to select one of the machines, view the menu of operating parameters, and adjust one or more of the displayed operating parameters. The portable device uses IP protocol to communicate any changes to a router at a remote PLC. The remote PLC then instructs adjustment of the operating parameter at the selected machine and updates the displayed operating parameters on the portable device. The operator can therefore manage critical operating parameters of the set of loin pulling machines from at or about the machines instead of having the time lag of walking sometimes substantial distances, which can take significant time, to the remote PLC.

In another aspect of the invention, a PLC including a web server can communicate loin puller adjustments to a loin puller machine. An additional adjustment option is given to authorized personnel in the form of a portable device that has a user-interface. The portable device is web-enabled and is essentially a client to a web-server at the remote PLC. Via wireless communication and IP protocol, the portable device generates an HMI (human-machine interface) with a pre-designed set of possible loin puller adjustments. A user of the portable device calls out the PLC web server by its internet routing address through a wireless router. The web server generates the HMI on the display of the portable device. The user can instruct adjustment of any of the set of adjustments and wirelessly communicate them back to the PLC. The PLC can then make the adjustments to the loin puller through its direct control. In this manner indirect control of specific allowed loin puller adjustments from at or near the loin puller can be made, avoiding time delay in having to move from machine to remote control room for such adjustments. The web-based HMI can present the allowed adjustments on the portable device in an intuitive and efficient way for quick and accurate decisions at the loin pullers. The remote PLC continues to have the full assortment of monitoring and control options and direct control over the loin pullers.

In another aspect of the invention, the portable device described immediately-above can control plural PLCs. The portable device HMI would present the operator with the option to select between any of the plural PLCs, each of which is wirelessly web-enabled and has a unique IP address.

These and other objects, features, aspects, and advantages of the invention will become more apparent with reference to the accompanying description.

III. BRIEF DESCRIPTION OF THE DRAWINGS

These drawings are appended hereto and will be referred to in the detailed description of exemplary embodiments which follows.

Figure 4A:
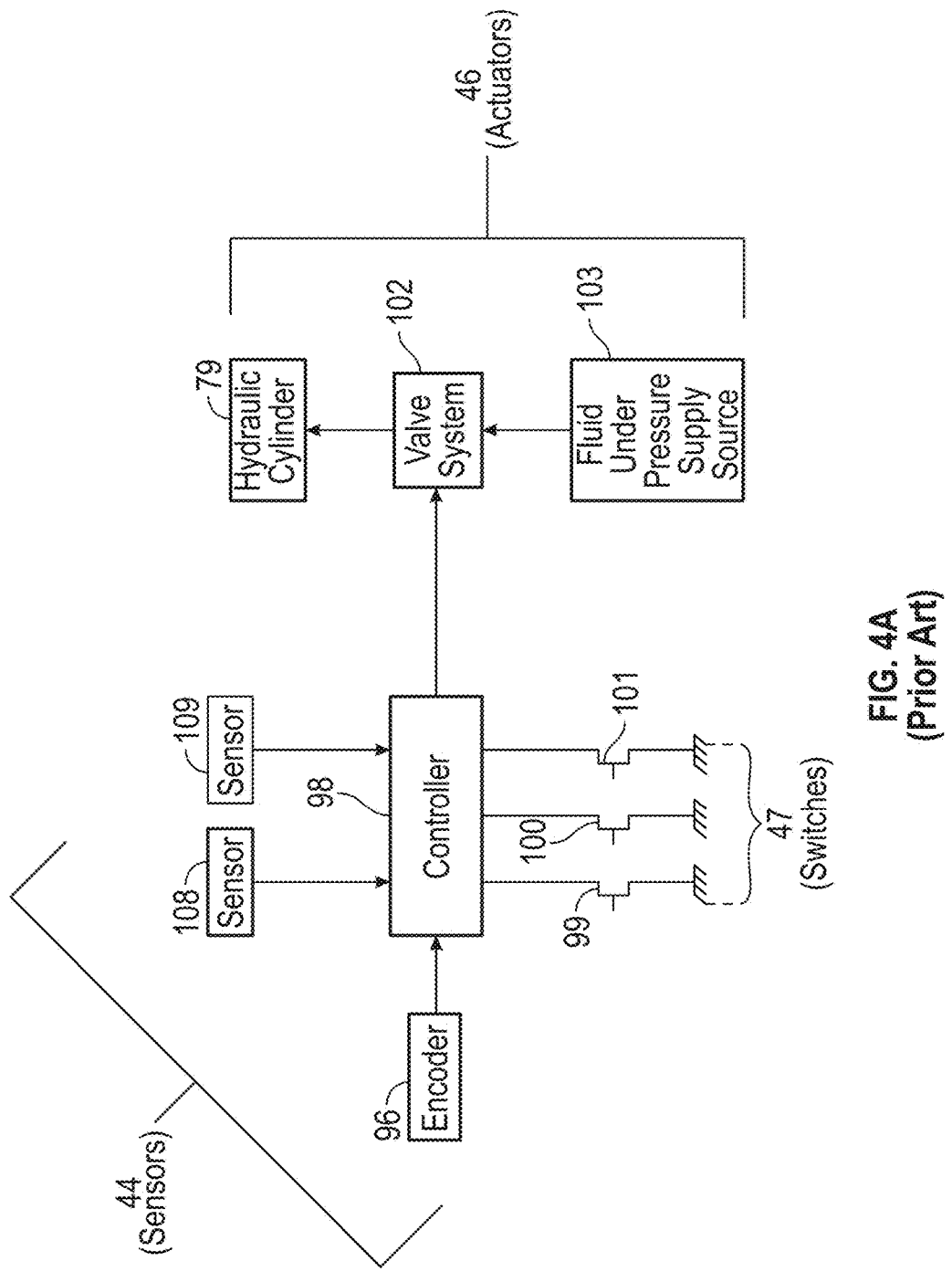
Figure 4B:
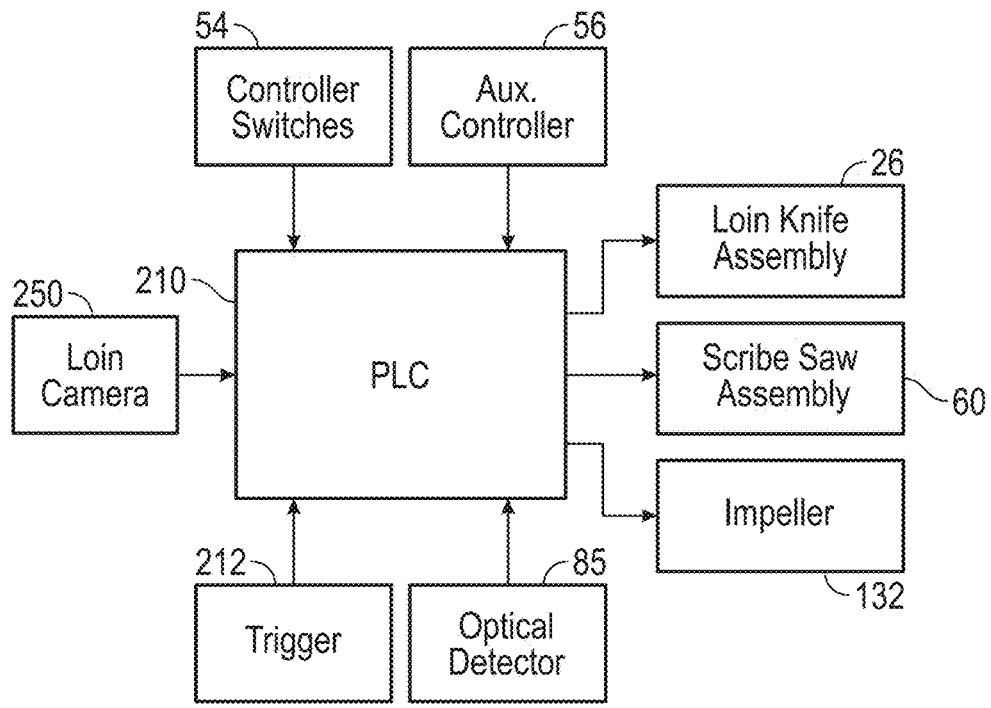
Figure 4C:
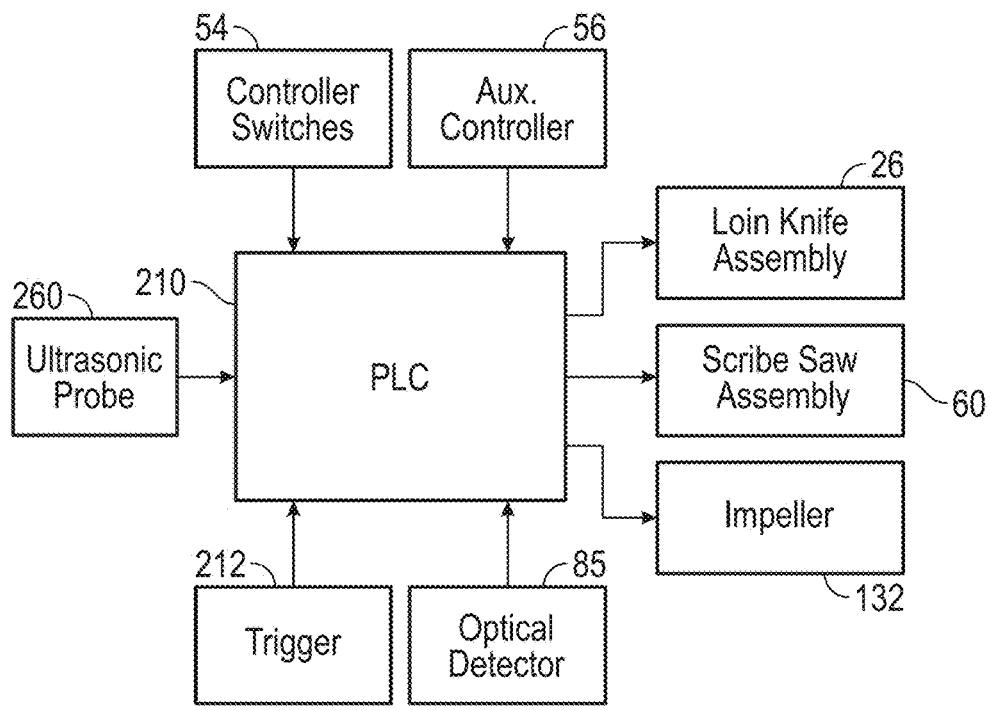

FIGS. 4A, 4B, and 4C are diagrammatical block diagrams of typical automated loin puller machines, showing sensors and a PLC to allow control of operating parameters of the machine.

Figure 5:
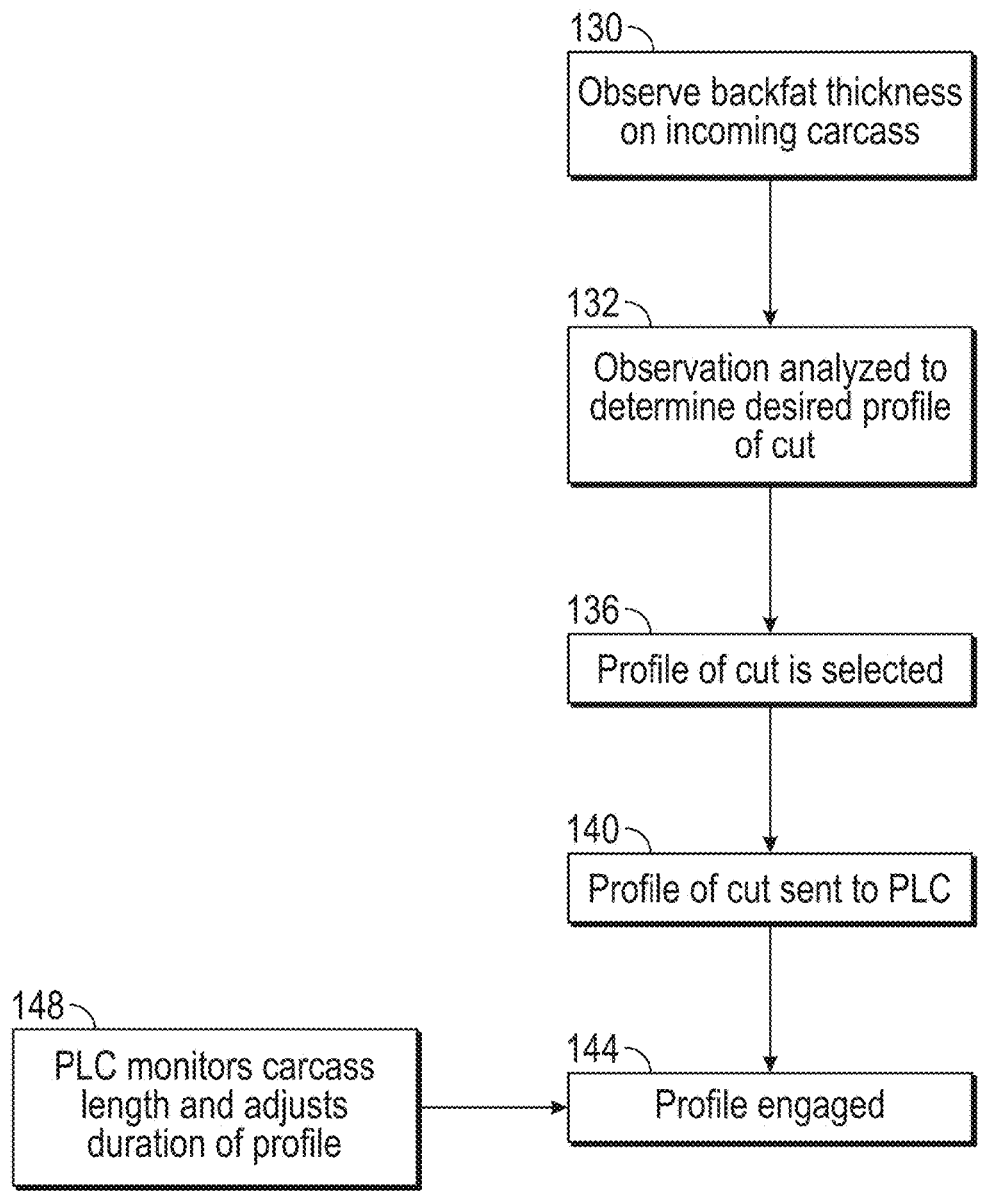

FIG. 5 is a flow chart of one example of automatic control of a loin puller machine by a PLC/sensor circuit such as FIG. 4A, 4B, or 4C.

Figure 6:
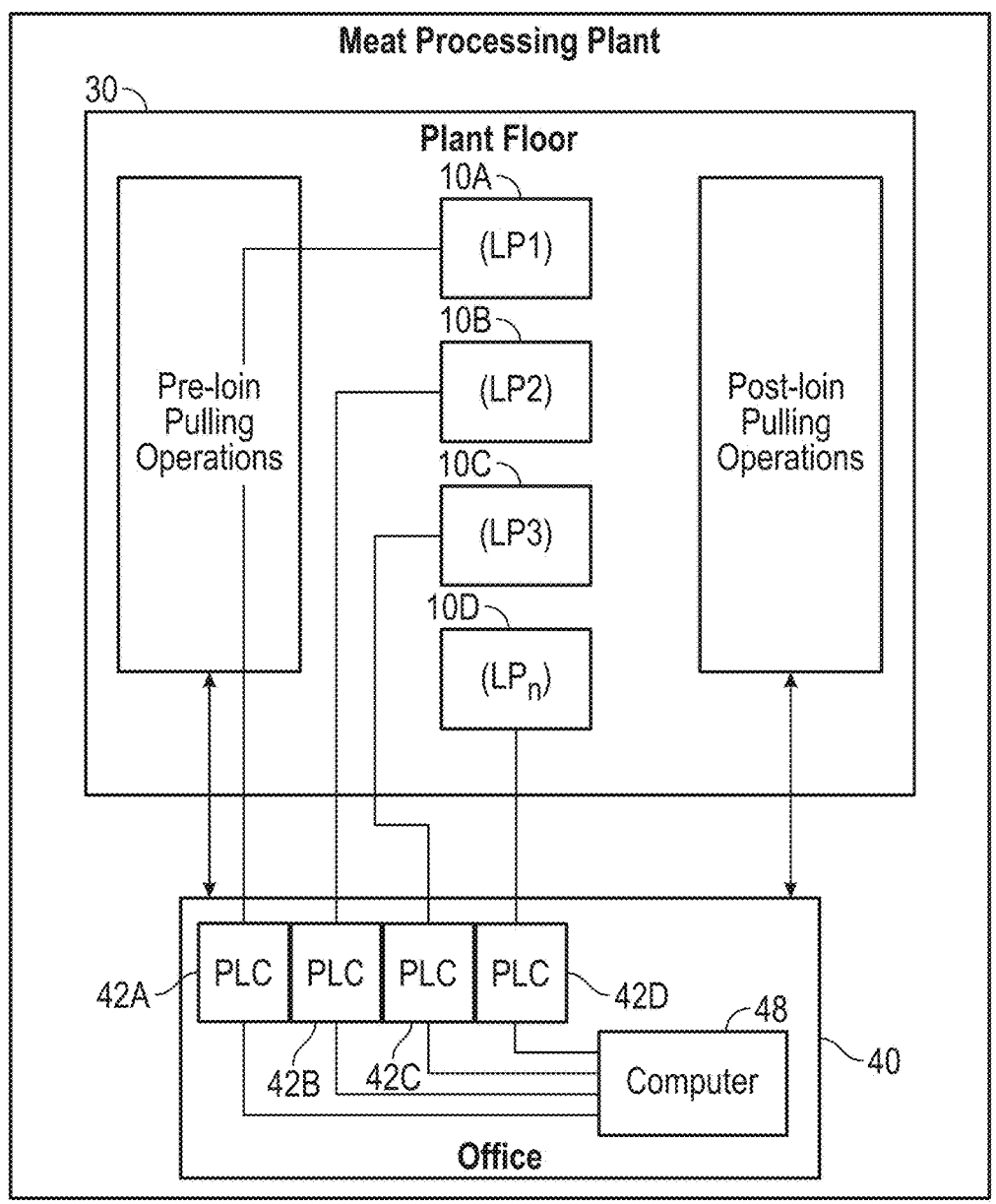

FIG. 6 is a plan view block diagram of a typical prior art meat processing plant floor plan with four loin puller machines out on the floor and a PLC and other control equipment in the protected office remote from the loin pullers.

Figure 7:
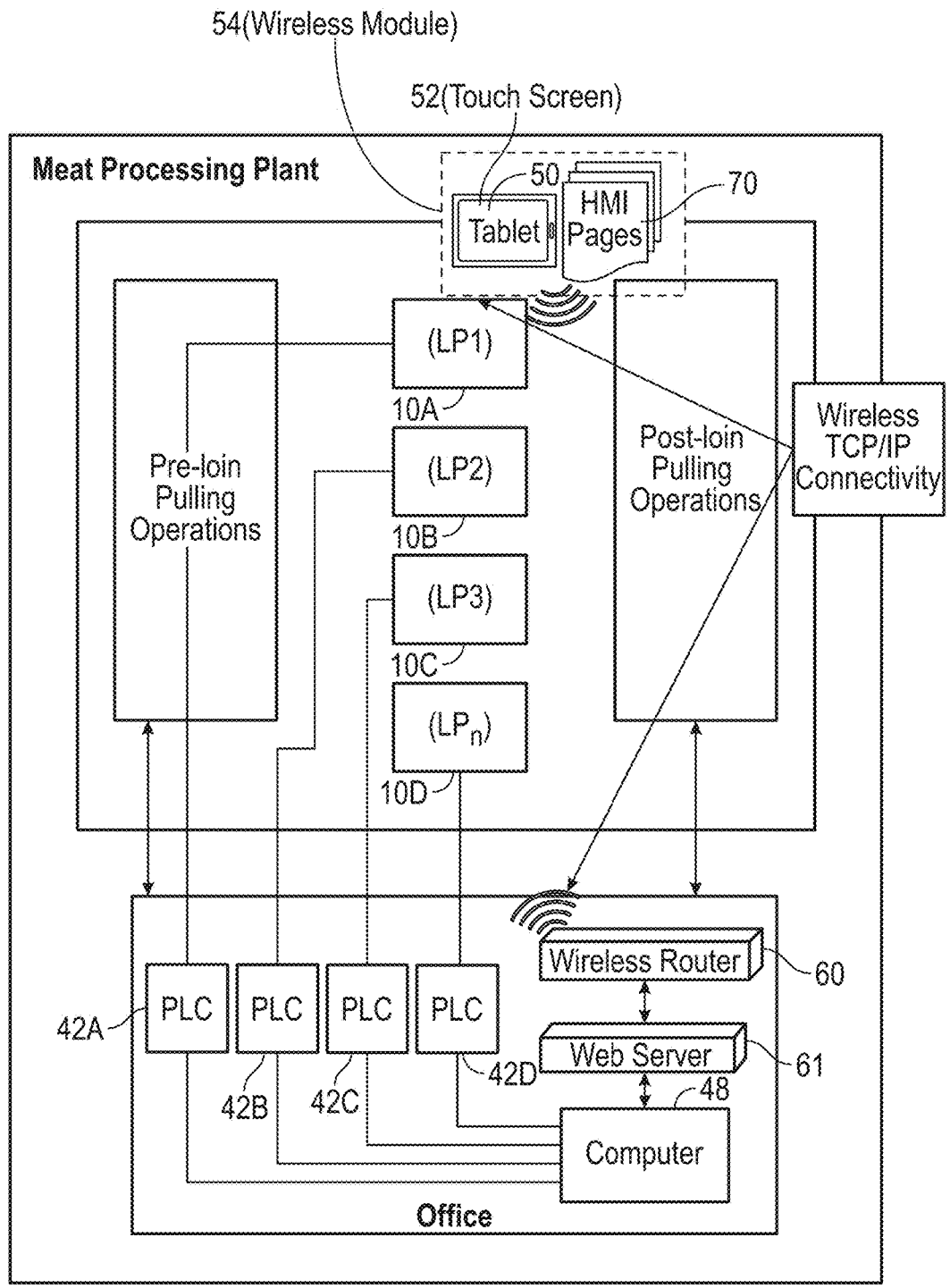

FIG. 7 is similar to FIG. 6 but illustrates an improved loin puller system according to one exemplary embodiment of the present invention.

Figure 8:
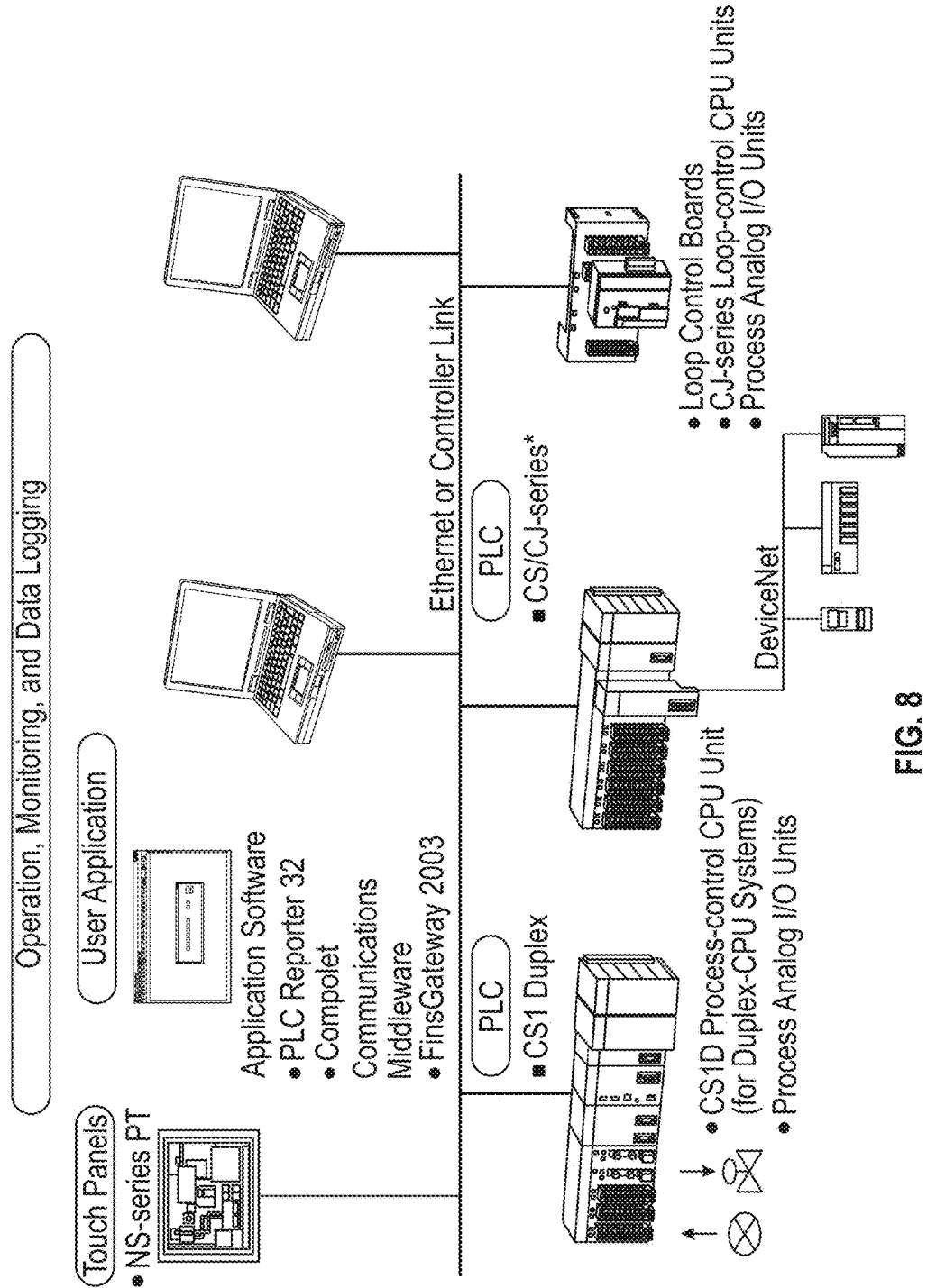

FIG. 8 is a diagrammatic view of a typical PLC sub-system.

Figure 9:
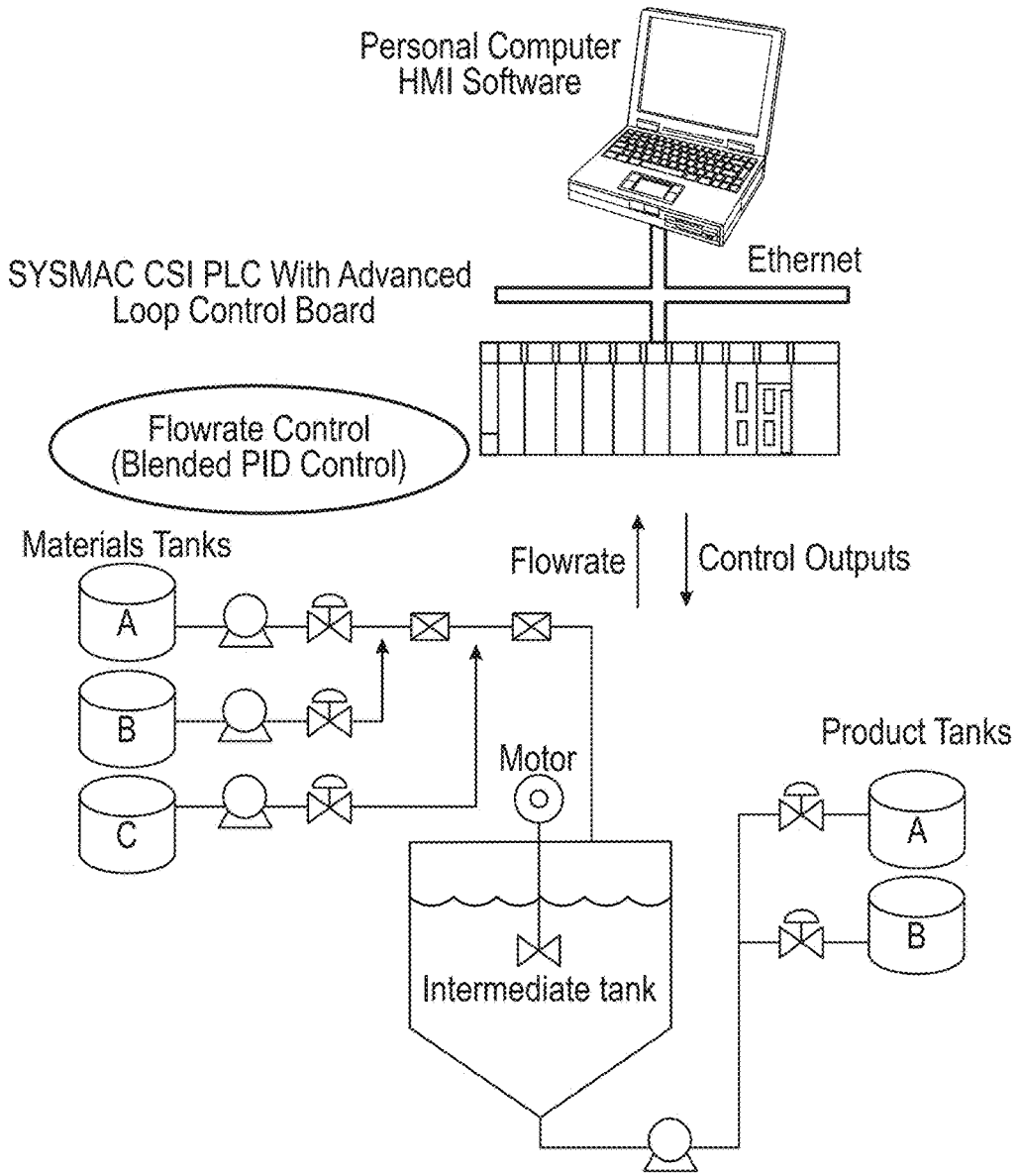

FIG. 9 is a diagrammatic view of how a PLC sub-system can be applied in a food plant.

Figure 10A:
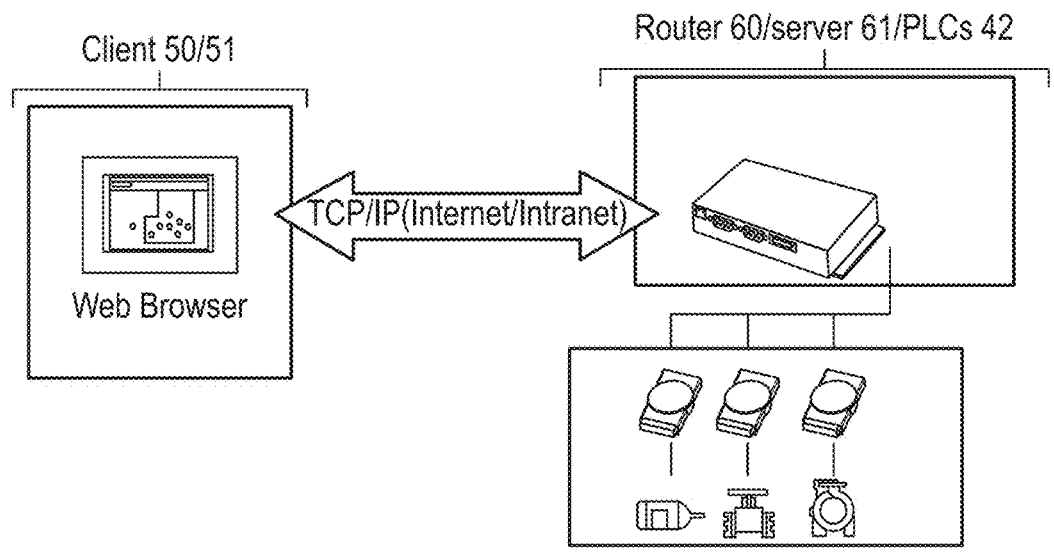

FIG. 10A is a diagram illustrating how IP protocol can be applied between a web browser and a PLC.

Figure 10B:
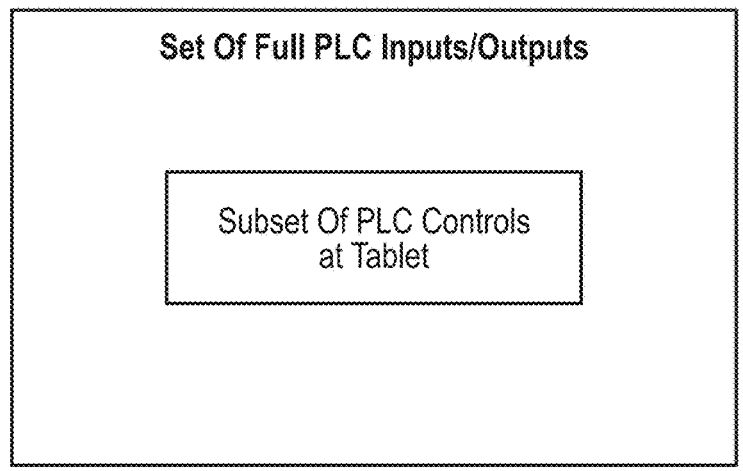

FIG. 10B is a highly diagrammatic depiction of the partitioning of the full set of possible PLC functions into a subset of specific loin puller adjustments allowed to be adjusted from the portable device.

Figure 11A:
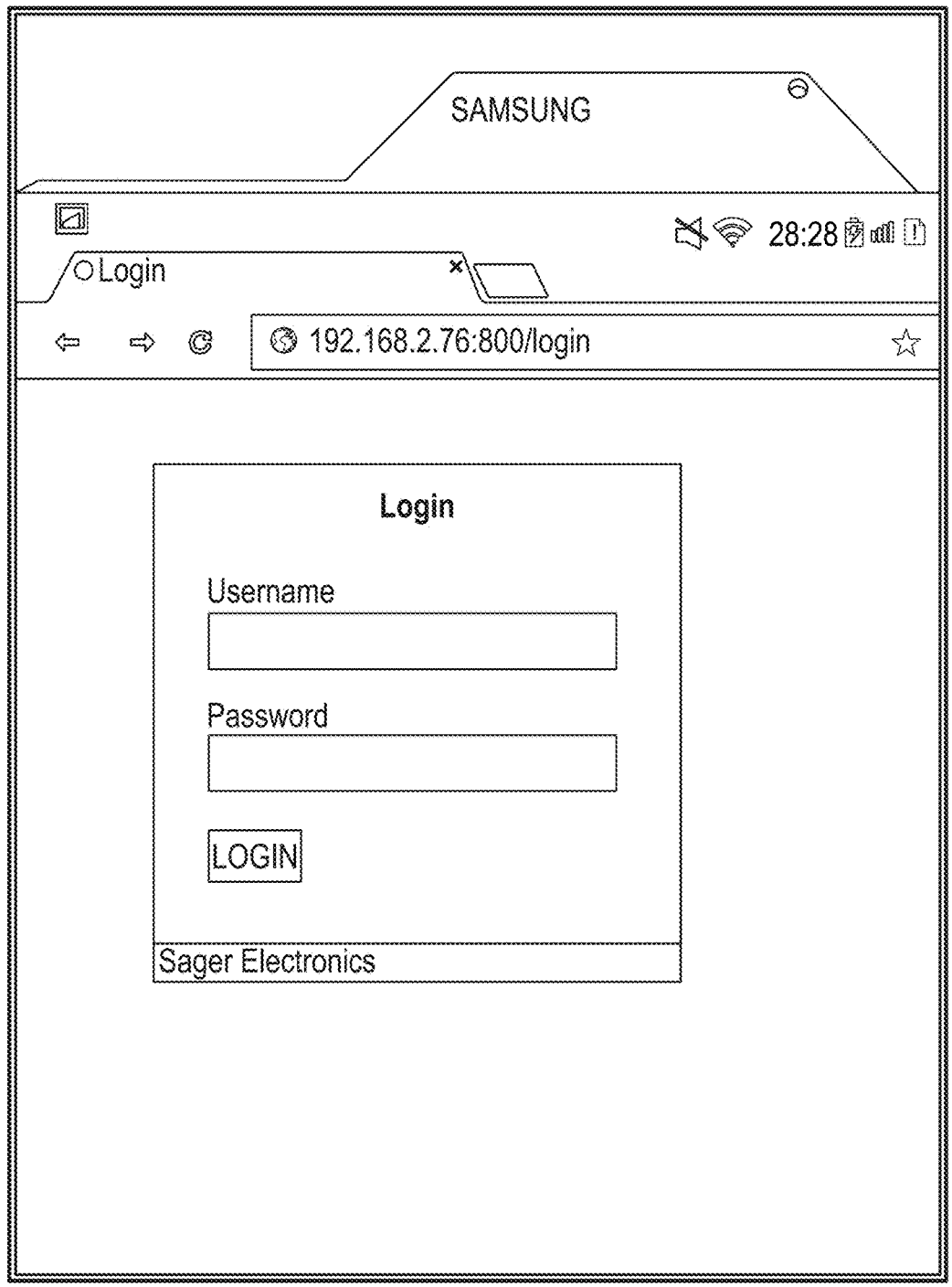

FIG. 11A is a screen display for log in to the portable wireless device of FIG. 7 using IP protocol according to one embodiment of the invention.

Figure 11B:
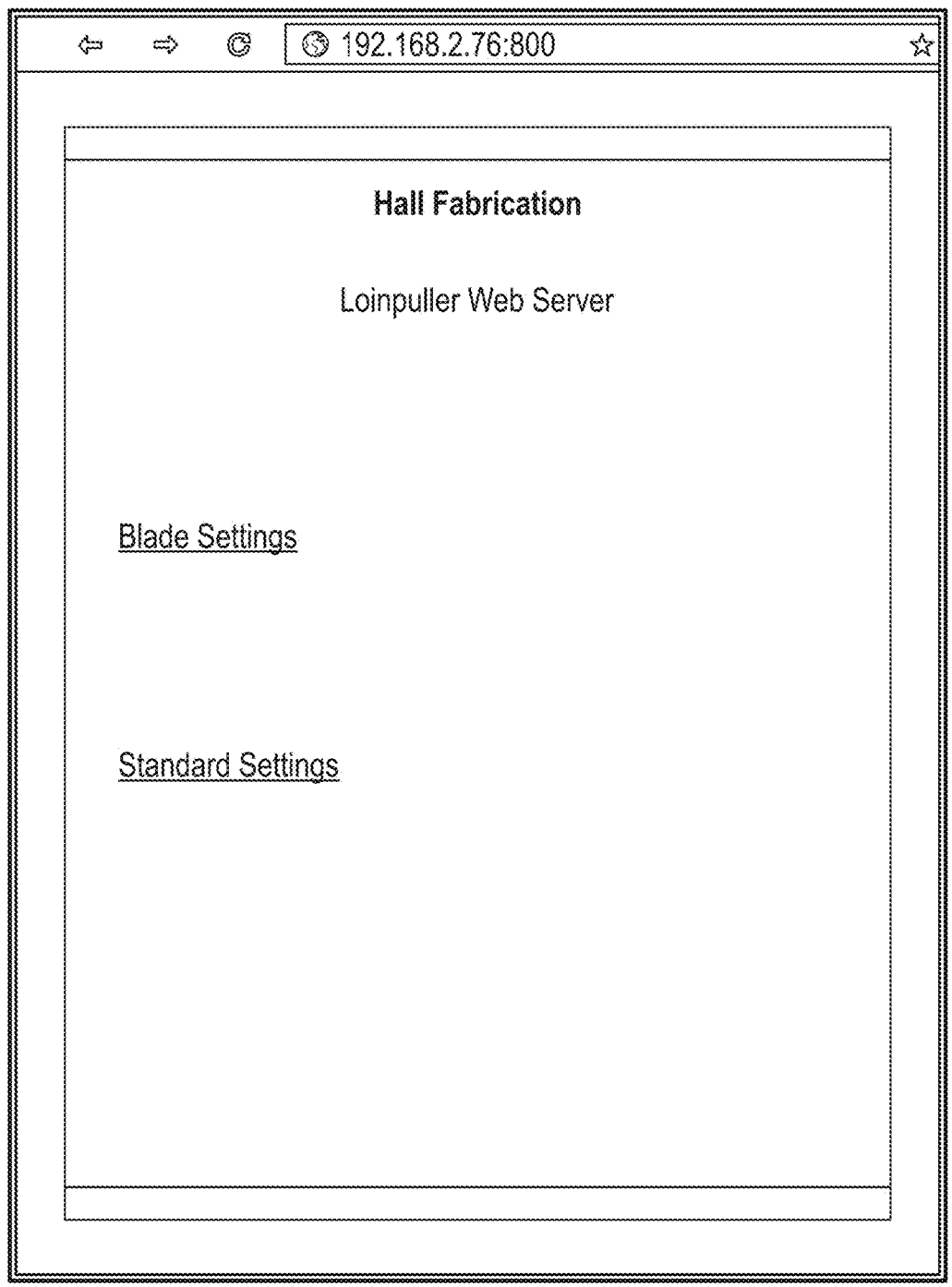

FIG. 11B is a screen display for selecting blade or standard settings.

Figure 11C:
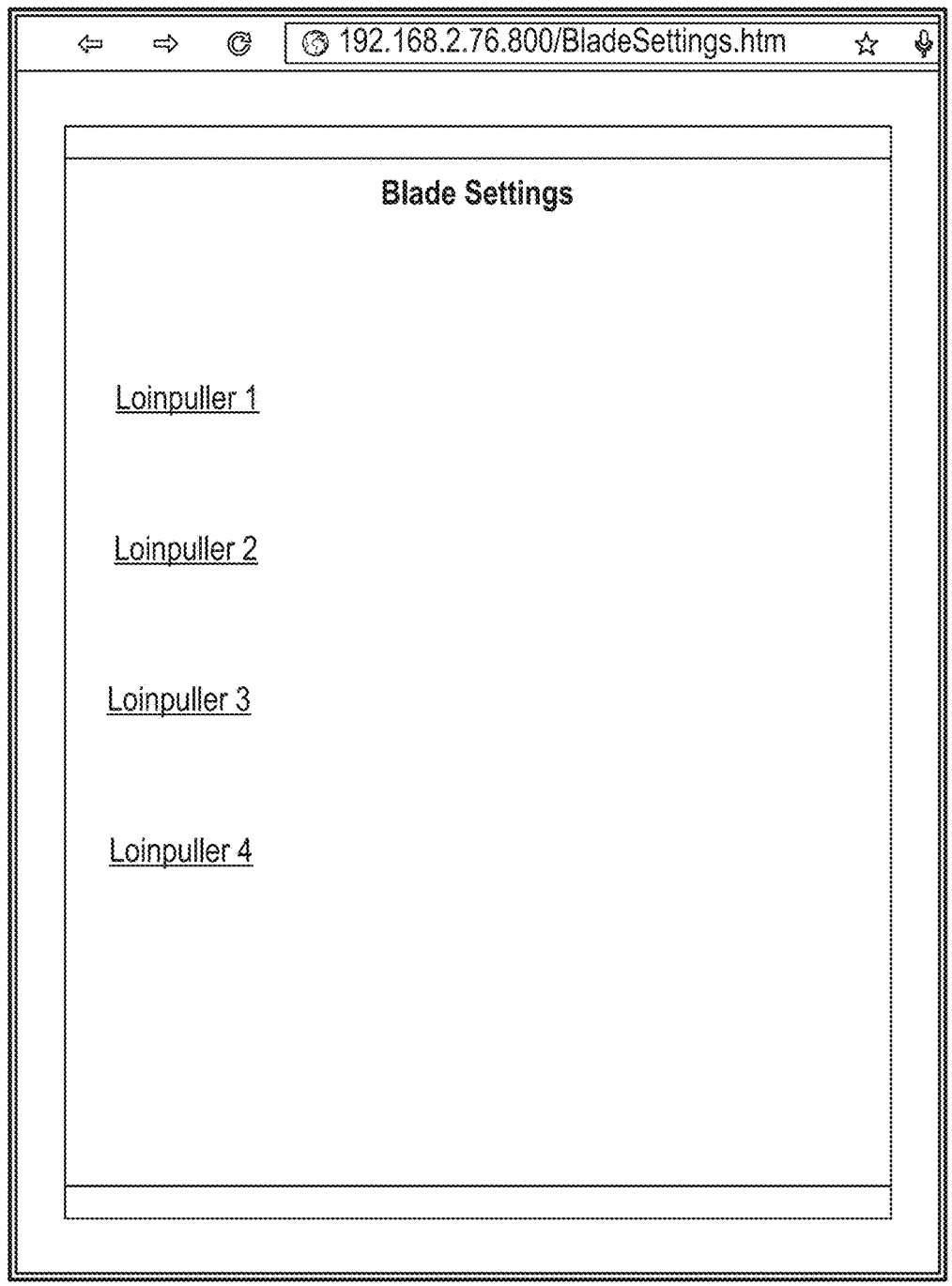

FIG. 11C is a screen display for selecting one of the loin puller machines of FIG. 7.

Figure 11D:
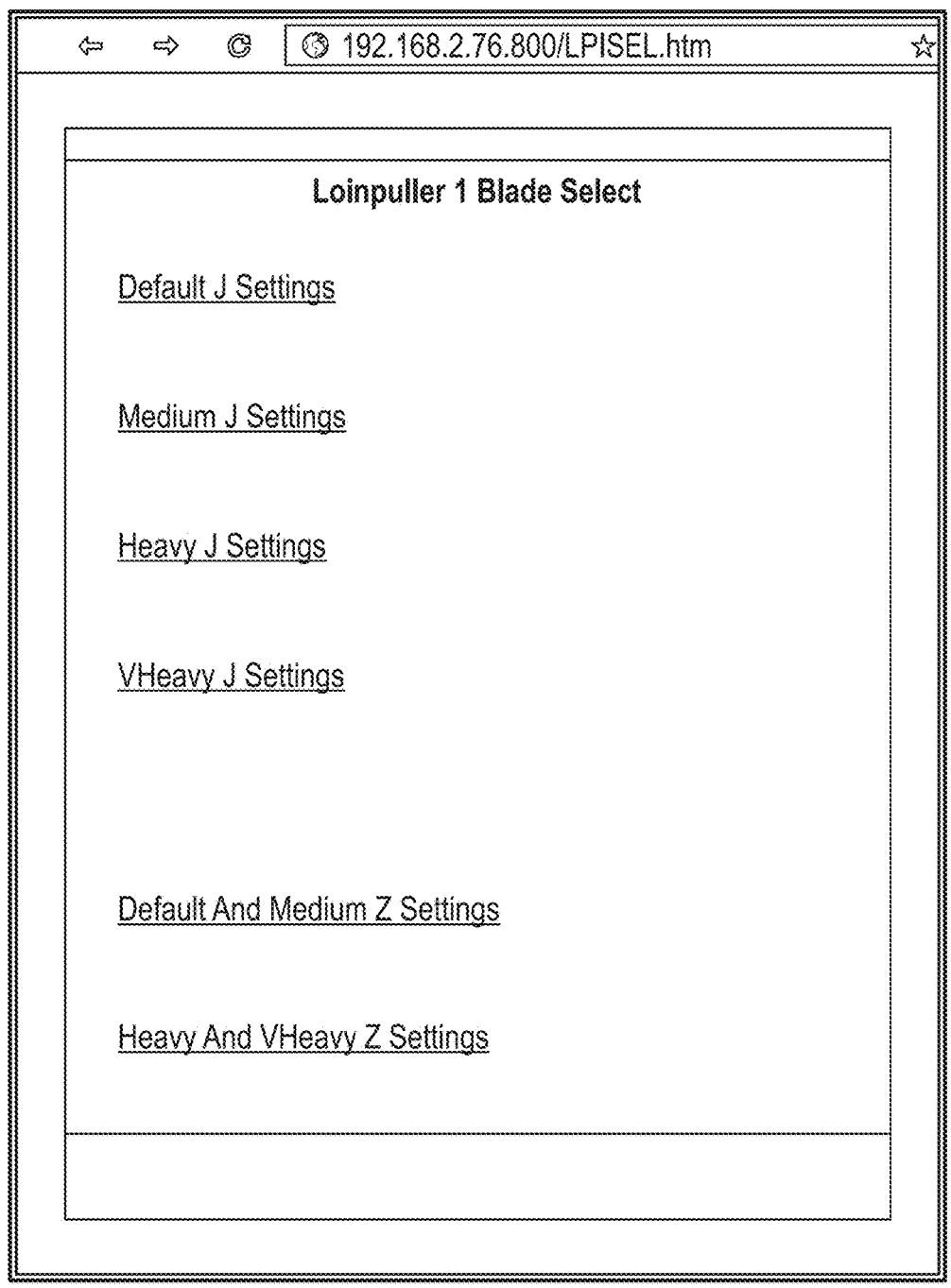

FIG. 11D is a screen display for selecting a sub-set of operating parameters for the selected loin puller machine of FIG. 11C.

Figure 11E:

FIG. 11E is a screen display for selecting a sub-sub-set of operating parameters for one of two blades of the selected loin puller machine of FIG. 11D, and the ability to adjust one or more of those parameters from the portable device.

FIG. 11F is a screen display for selecting a sub-sub-set of operating parameters for the other of two blades of the selected loin puller machine of FIG. 11D, and the ability to adjust one or more of those parameters from the portable device.

IV. DETAILED DESCRIPTION OF EXEMPLARY EMBODIMENTS OF THE INVENTION

For a better understanding of the invention, different forms and embodiments that invention can take will now be described in detail. It is to be understood that these examples are neither exclusive nor inclusive of all the forms and embodiments the invention can take.

A. Overview

These embodiments will be discussed primarily in the context of loin puller machines for meat processing plants. However, the invention can be applied in analogous ways to other meat processing machines. Examples include but are not limited to one machine needing daily adjustments or monitoring can be placed on its own wireless controller, or alternatively, can be added to the controller of other machines.

Furthermore, the examples below are focused upon a portable web-enabled digital device in tablet form using wireless communication and TCP/IP protocol, and PLCs having a web server and wireless router. Variations well-known to those skilled in these technical areas are possible and included in the envisioned implementations of the invention.

B. Apparatus

Figure 1A:
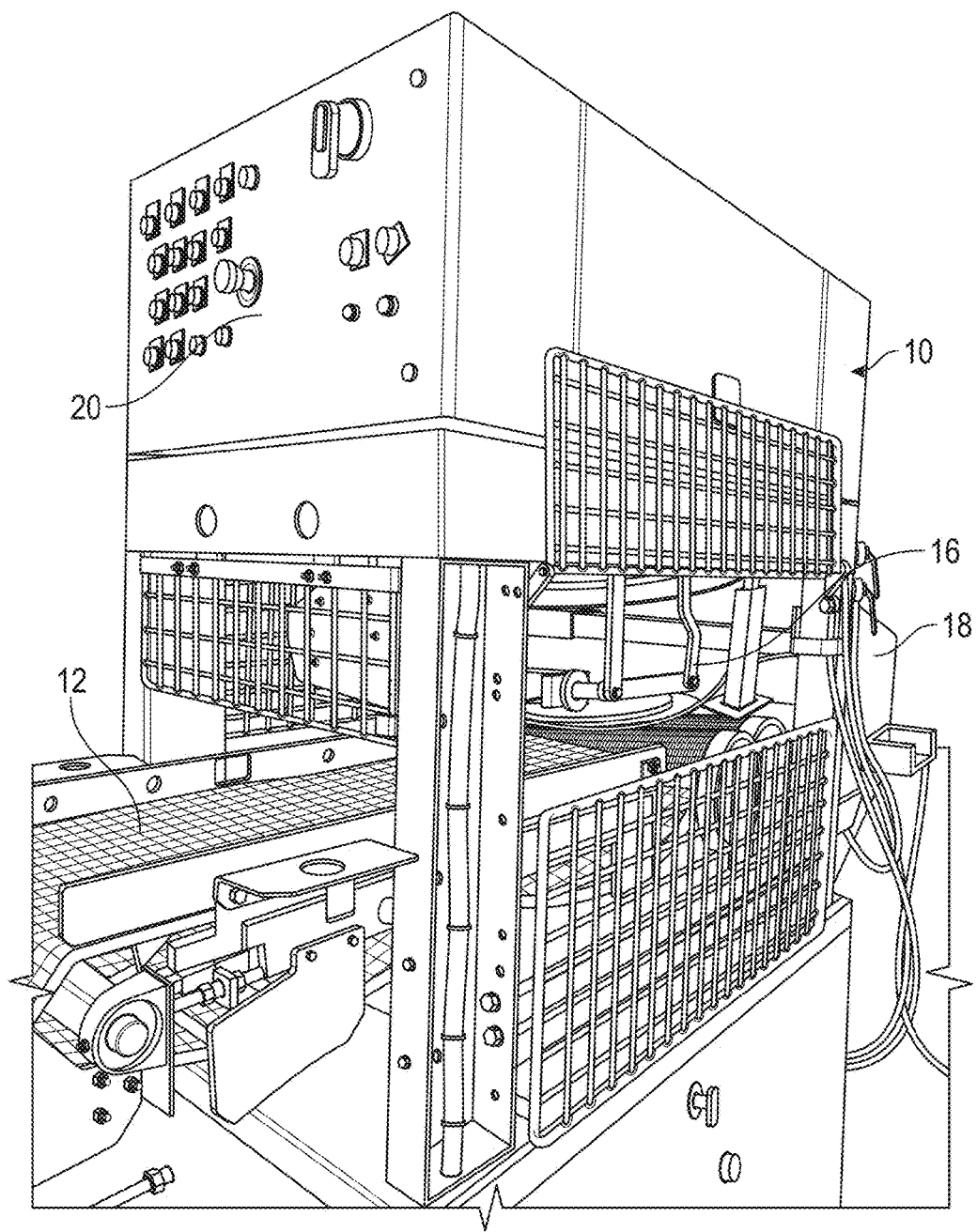
FIG. 1A is an image of one example of a commercially available loin puller machine.

FIGS. 1A and B through FIG. 6 illustrate typical state-of-the-art loin pullers and PLC control paradigms for them. Such PLC-controlled systems are commercially available from a number of sources, including but not limited to SFK LeBlanc, having multiple offices including in Kansas City, Mo. (US) (see www.sfkleblanc.com). Loin pullers and/or control systems that utilize PLCs, a variety of sensors, and communications with other components via, e.g., Ethernet or other communications links, are available from SFK LeBlanc and from vendors such as Acraloc Corporation, Oak Ridge, Tenn. (US). Further details can be seen at the following incorporated by reference patents:

U.S. Pat. No. 7,118,471 Hall Fabrication, Rushville, Ill. (US)

U.S. Pat. No. 7,226,350 Hall Fabrication, Rushville, Ill. (US)

U.S. Pat. No. 7,354,339 Hall Fabrication, Rushville, Ill. (US)

U.S. Pat. No. 6,089,968 Acraloc Corporation, Oak Ridge, Tenn. (US)

U.S. Pat. No. 6,547,658 Acraloc Corporation, Oak Ridge, Tenn. (US)

U.S. Pat. No. 6,336,856 G. E. Leblanc Inc., St-Anseline (CA)

U.S. Pat. No. 7,214,129 G. E. Leblanc Inc., Anseline, Quebec (CA)

Such systems are well-known to those skilled in the art.

The diagram of FIG. 6 is intended to give a simplified illustration of state-of-the-art automated and PLC-controlled loin puller systems. Note that in this example, four loin puller machines 10A-D are on the plant floor. The remote, protected office 40 includes one PLC 42A-D for each machine 10. This allows individual control of each machine 10. Appropriate programming of the PLCs and access to other data and information (e.g. a library of machine operation profiles) either at each PLC or available via a connected PC-based computer 48, allow a large number of options and capabilities to the PLCs and machines. In this example, the components communicate via hard-wired connections.

Figure 1B:
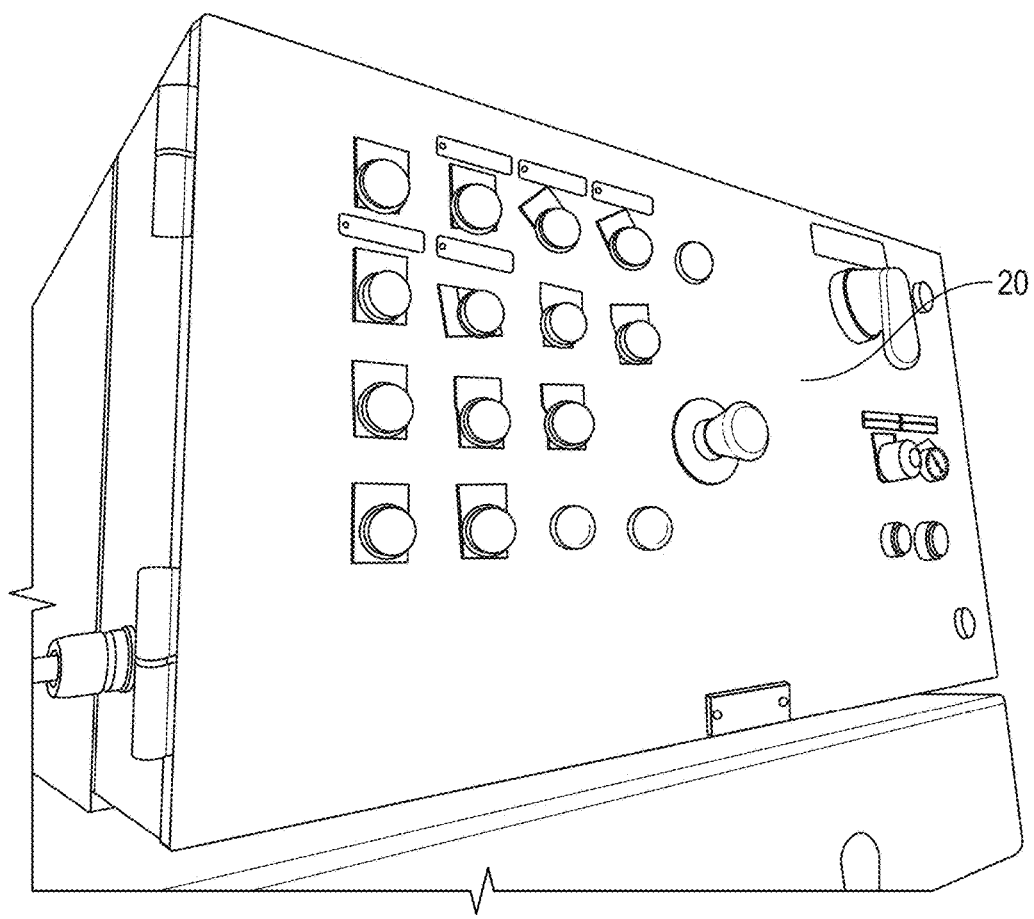
FIG. 1B is an enlarged image of the control panel for making operational adjustments at the machine of FIG. 1A.
Figure 2A:
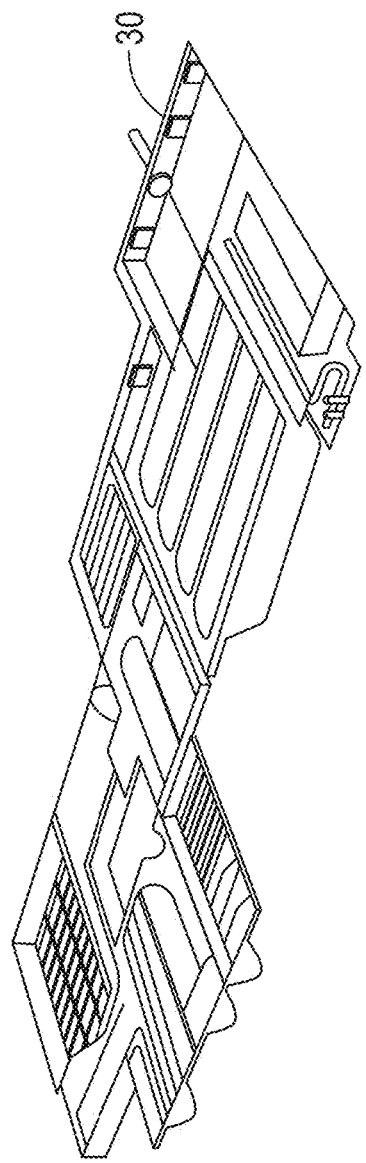
FIG. 2A is a diagrammatic depiction of a typical meat processing plant floor plan.
Figure 2A:
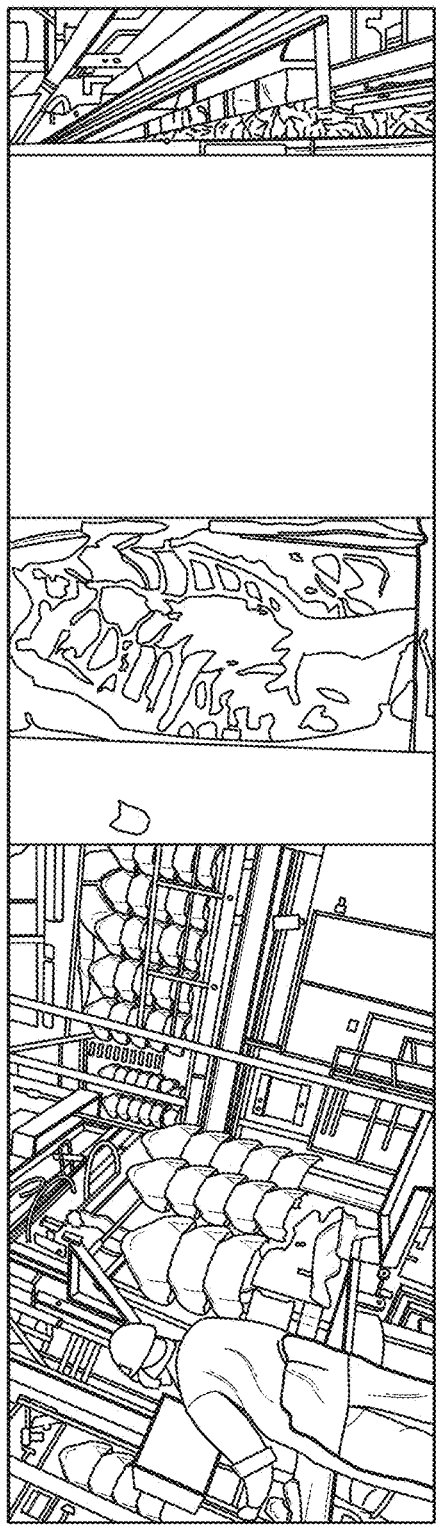
Figure 2B:
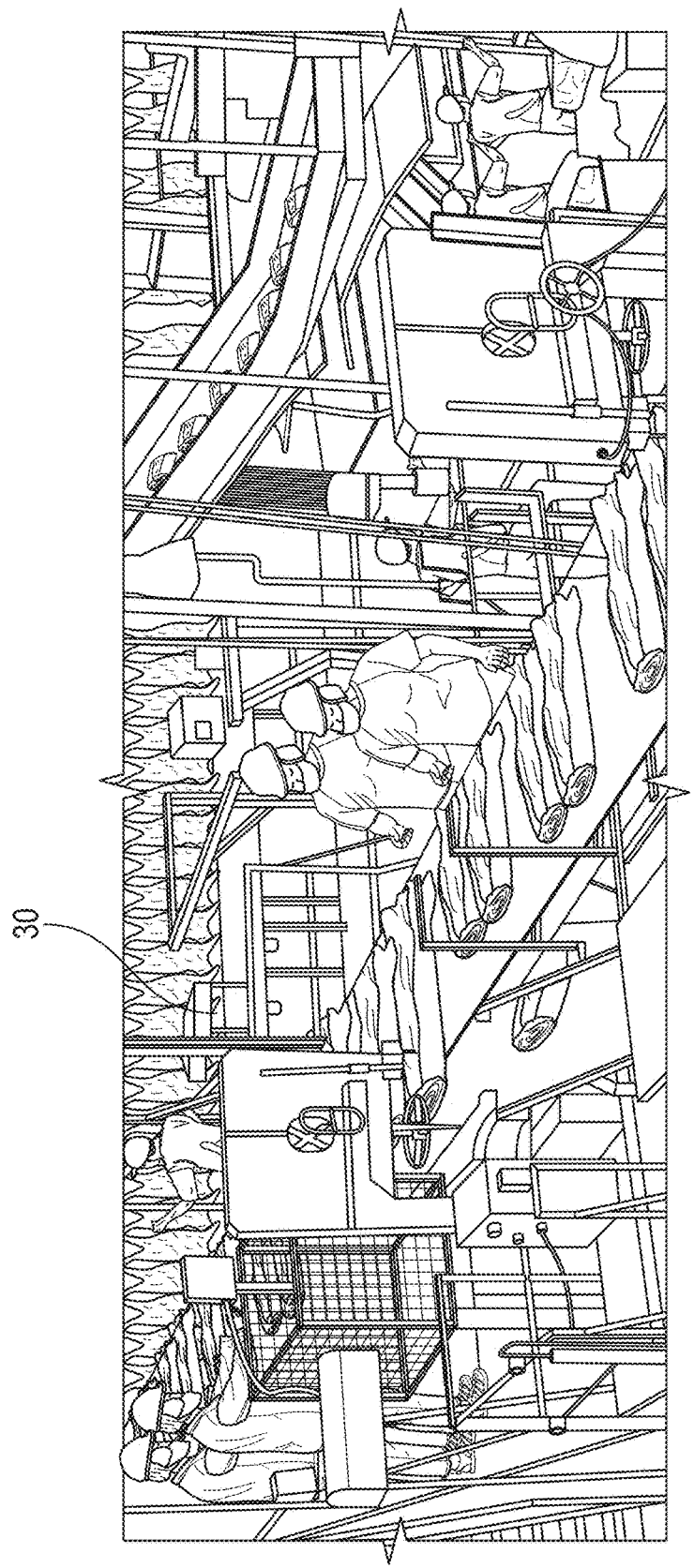
FIG. 2B is an image of just a portion of a typical meat processing plant floor plan.
Figure 3:
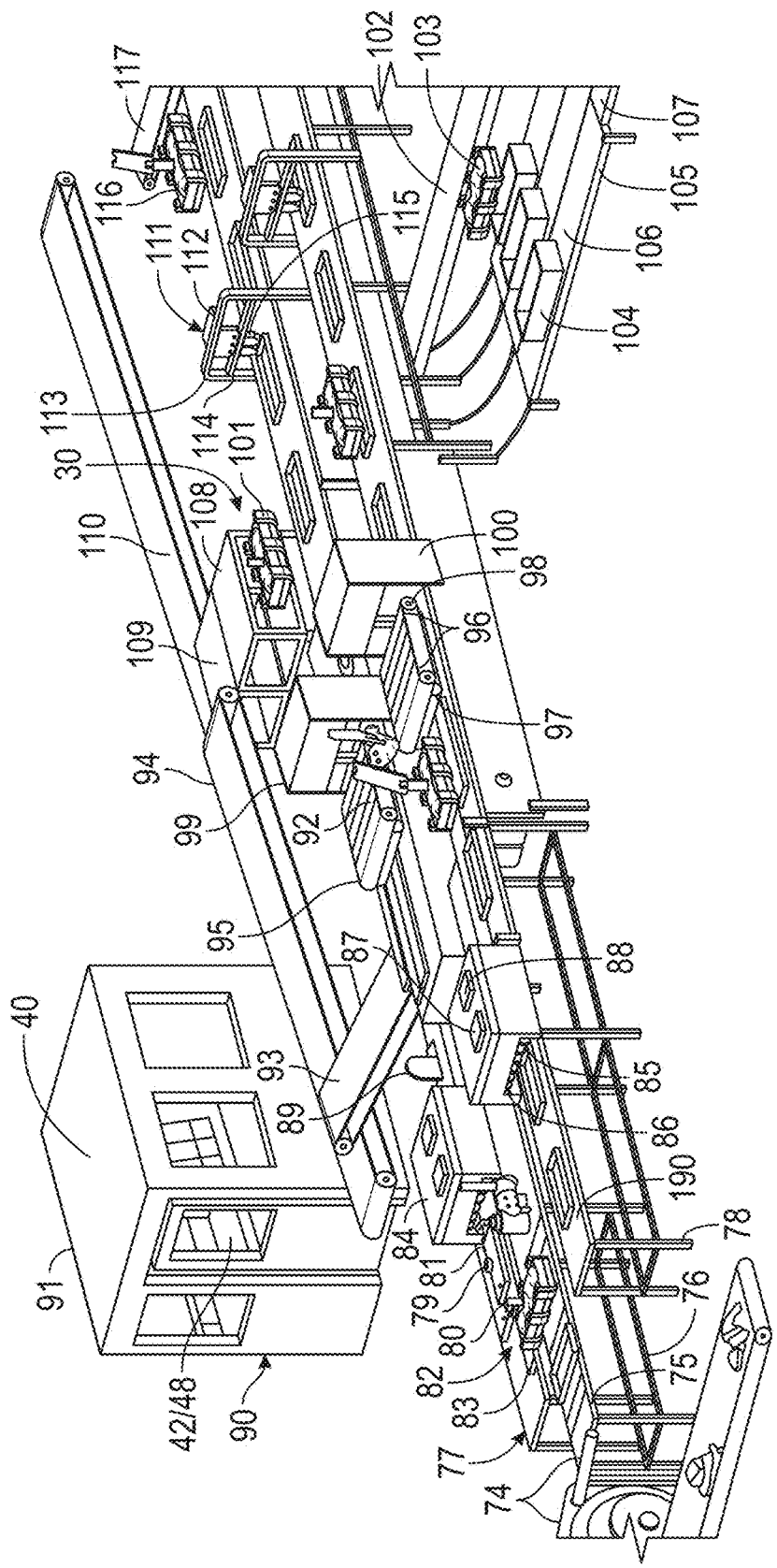
FIG. 3 is a perspective diagram of a portion of a typical meat processing plant floor plan and enclosed, protected office.

In comparison, and with reference to FIG. 7, a first embodiment of the invention is diagrammed. It includes a typical automated loin puller system 10, as in FIG. 6. See also, e.g., U.S. Pat. No. 6,089,968. PLCs 42 in protected remote office 40 are hardwired to each of four loin puller machines 10A, 10B, 10C, and 10D. Each machine 10A-D can have a variety of operating parameters monitored and adjusted either at the machine 10A-D (see control panel 12 in FIGS. 1A and 1B) or at its remote PLC 42.

However, as discussed earlier, adjustment at a machine 10 via manual control panel 12 would be without the benefit of being at PLC 42. And being at PLC 42 requires moving substantial distance, which eats up valuable time.

The exemplary embodiment of FIG. 7 introduces the following.

A web-enabled tablet computer 50 with a touchscreen display and user interface 52, and wireless transceiver 54, can be carried by a worker. Tablet 50 can be any of a variety of commercially-available products. As will be appreciated, other digital portable devices are possible, such as lap tops, smart phones, etc.

A wireless router 60 and web server 61 are installed at each remote PLC 42. These components are also available commercially from a wide variety of vendors. In this example, loin pullers 10A-D are from SFK LEBLANC of Denmark, with motion control from Acraloc of Oak Ridge, Tenn. (USA). A web-enabled HMI can be from Beijer Electronics of Salt Lake City, Utah (USA).

A computer 48 (or other intelligent device) is connected to PLCs 42, as is also typical. The system of FIG. 7, like that of FIG. 6, allows direct monitoring and control of all four pullers 10A-D from corresponding PLCs 42 and computer 48. This combination allows a complete, complex, and wide arrange of monitoring and control options at the remote office.

As is well-known to those skilled in this technical art of loin pullers, each loin puller has a set of plural operating parameters. They relate to the many different functions of or variables regarding the machine, from how carcasses are moved through the machine, held in various positions, and cut. They include feedback from sensors that inform automatic adjustment of cutting blade position. Other examples are temperature, size of carcass, genetics of carcass, and cut specifications. These will be referred to collectively as the set of loin pulling machine operating parameters. These are individualized for each loin puller machine 10A-D. They can be similar or different between machines 10A-D. There can be other operation parameters considered by the PLC or computer in the protected office, such as feedback from earlier or later stations in plant 30 (e.g. to slow, stop, or speed up carcass movement through loin pullers 10A-D to compensate for other machines on the plant floor). Typically the loin puller has one or more each of sensors 44, actuators 46, and switches 47 that can be coordinated according to a profile instructed from a dedicated PLC 42.

C. Operation

As known to those skilled in this art, loin pullers can require multiple changes every day; indeed every shift and maybe every carcass. Adjustments in automated loin pullers are normally through an HMI (human-machine interface) at each PLC 42 controlling pullers 10A-D respectively. To address the problems identified in the state-of-the-art, this embodiment of the invention adds indirect control of a pre-designed subset of loin puller adjustments right at any of pullers 10A-D. The indirect control is effectuated as follows.

Each web server 61 at each PLC 42 is given a unique IP address. Tablet 50, being wireless and web-enabled, is essentially a client for any of the web servers 61. By IP protocol, the client tablet 50 on-board browser can wirelessly (via an integrated wireless module 54) send out a request to access a web server 61. The accessed web server 61 responds by essentially building an HMI on touchscreen 52 of tablet 50.

A plurality of browser pages 70 are thus made available for display on tablet 50, communicated between the tablet's wireless module 54 and wireless router 60 at a PLC 41. This allows a back-and-forth communication which results in a display of a subset of loin puller operating parameters in a variety of displayed pages 70 on touchscreen 52 of tablet 50 (by its connection to and translation of operating parameters at PLC 42). The communication is essentially via IP addresses through wireless routers 60 to the wireless HMI with a web site. This essentially uses tablet 50 as an "industrial access point" to allow an operator at a loin puller 10 to, by touch user interface haptic feedback, indirectly communicate in real time back to PLC 42 instructions to make desired adjustments to one or more loin puller operating parameters.

This is counter-intuitive at least in the following ways. First, it adds components, and associated cost, to the system. Second, it is not a direct control of loin pullers 10, but rather is indirect. Third, it does not require all the functions at the PLC HMIs, but rather can be tailored to just that subset of adjustments deemed by the designer to be needed.

But this arrangement addresses the problems and deficiencies in the state-of-the-art at least in the following ways. It gives local control to at least the subset of adjustments at the machines 10. Any time lag between indirect control from tablet 50 is small. The operator can power up tablet 50 at the beginning of a shift. This ensures only an authorized person has such control. Wireless transmission and present processing speeds can be almost real-time. A single tablet can control any number of machines 10, and the operator of tablet 50 is presented with a straight forward, non-complex HMI to select any machine 10 and then make any of the subset of adjustments. This further makes efficiency of control, even though indirect, meaningful. And because the portable tablet does not need all the capabilities of the PLCs and computer, the operator has a limited but very effective set of screens and prompts to consider to help make efficient decisions and instructions when at the loin puller machines 10A-D.

Furthermore, the freedom of movement of the supervisory worker is not materially inhibited. The worker needs to move around the various machines continuously. But the supplemental tablet control option is available right there at any of the machines.

Still further, if there is a problem with the tablet 50, or its communication with office 40, it would not require a suspension of operation of the normal operation of the loin pulling. It would still continue under the direct control of the PLCs 42. The use of wireless and web-based HMI means either a substitute, basically off-the-shelf tablet could be obtained and the local tablet control option reinstated, or technical staff could troubleshoot the original tablet.

The use of a web-based device to allow such client-server interaction is well-known by those skilled in that art. In this embodiment, tablet 50 essentially allows a worker to carry an abbreviated HMI around on the plant floor and at the relevant machines. The mobile HMI interfaces with any of the four PLCs 42 which control the machines 10.

The user basically stands in front of any of loin pullers 10A-D, selects that machine 10A, B, C, or D, and makes any adjustments from a menu of displayed possible adjustments on the tablet screen. Access to those adjustments takes just a tapping in of the appropriate IP address (after gaining access via standard security and initialization as with a user name and password tapped in via tablet touch screen). The appropriate web server responds with generation of the HMI at tablet 50 via its wireless router. Tablet 50 basically accesses a pre-designed web site. The tablet displays are basically pre-programmed web pages 70. As can be appreciated by those skilled in the art, tablet basically installs and runs client applications from a web browser. It uses IP addresses and protocols to route packets with routing protocols based on a URL. TCP/IP is one example of a protocol.

Tablet 70, by its inherent nature, is light-weight, highly portable, and has the ability to display the abbreviated HMI to the user. It is also somewhat resistant to such things as water, debris, dust, vibration, and the like because it is self-contained (no wired connections to such things as keyboards, separate displays, or processors). It can be made more resistant and rugged with commercially available covers or cases that still allow touch screen operation.

The precise way the office components communicate to the tablet can vary according to need and desire. FIGS. 8 and 9 are diagrams which illustrate some basic principles involved.

FIG. 8 shows a typical PLC for industrial control. It can include Ethernet or other controller link between the PLC CPU unit and a variety of inputs and outputs. Other components can include pull PC-based computers with specific application software and to displays for HMIs.

FIG. 9 shows how a typical PLC interacts with a computer and various inputs and outputs in a food production process.

FIG. 10A diagrammatically illustrates how IP protocol (here TCP/IP) can be used to communicate between a web-based browser and a PLC which, in turn, controls various actuators. This arrangement allows the browser to generate an HMI for instructing the PLC.

As illustrated at FIGS. 8, 9, and 10A, the improved system uses web-based user interfaces or web user interface WUI to accept input and provide output by generating web pages which are transmitted via the internet and viewed by the user using a web browser program. Java, JavaScript, Ajax, apache Flex, .NET framework technologies or other real-time control in a separate program, eliminate need to refresh a traditional HTML based web browser. Administrative web interface for web-servers, servers and networked computers are often called control panels.

Note that an HMI at each PLC 42 can also exist. Those HMIs can be the user interface for the direct control of the loin pulling manufacturing or process control system from protected office 40. It can provide a graphics-based visualization of an industrial control and monitoring system. Such an HMI typically resides in an office-based Windows computer (such as computer 48 of FIG. 7) that communicates with the more specialized programmable automation controller (PAC) or programmable logic controller (PLC) (such as 42).

In this embodiment of the invention, a secondary or supplemental HMI is also made available via tablet 50. The tablet HMI interfaces with the four CPUs in PLCs 42 to allow indirect control of at least some functions of pullers 10A-D. The peripheral hardware (the sensors and actuators of the conveyor, blades, etc.) of machines 10A-D are INPUTs and OUPTUTs to PLCs 42. Tablet 50 communicates with controllers 42 via routers 60. As diagrammatically illustrated in FIG. 10B, the HMI at tablet 50 does not have to have the full control HMI of controllers 42. It can be an abbreviated subset of all possible HMI control options at controllers 42. This can simplify and make more efficient the critical minute-by-minute adjustment decisions that arise during operation of loin pullers 10.

FIGS. 11A-F provide one example of a specific set of tablet adjustment options according to one exemplary embodiment of the invention. It is to be understood that different sets of options are possible, including more, less, or different options, according to need or desire of the designer. In this example, the options are selected for being deemed meaningful for typical loin puller operation.

FIGS. 11A-F are screen shots of the HMI at tablet 50 according to this exemplary embodiment. As will be appreciated by those skilled in the art, variations of these screens are possible. But it should be noted that the textual and graphic presentations are intended to be efficient for the user to select between specific loin pullers, and then quickly and effectively choose the options and make any adjustments deemed necessary on an ongoing basis.

Log In

For security and process control purposes, a first log in page 71 can be displayed at tablet 50. See FIG. 11A. A user name and password are required for log in. As shown, the page is accessed via an IP address (see address bar in FIG. 11A). In this example, the IP address is 192/168.2.76:800/login.

Selection of Subset of Operating Parameters

After log in, page two (FIG. 11B) would display on tablet 50 as a "main screen". In this example, it allows the operator to select between "Blade Settings" and "Standard Settings". Note the IP address is 192.168.2.76:800.

"Blade Settings" are a sub-sub-set of loin puller operating parameters particularly related to the cutting blades (e.g. height relative to a reference, angle, etc.). In this example for loin pullers 10A-D, there are two blades, namely, the J-Blade and the Z-Blade such as are well-known in this art. See, e.g., previously mentioned U.S. Pat. No. 7,118,471.

"Standard Settings" are a sub-sub-set of loin puller operation parameters particularly related to other than blade settings. See discussion above. These are well-known in this art.

Selection of Loin Puller

The third page (see FIG. 11C) presented on tablet 50 after selection of "blade settings" on PAGE 2 (FIG. 11B) lists each of the four loin pullers 10A-D, here at 192.168.2.76:800/BladeSettings.htm by:

Loin puller 1
Loin puller 2
Loin puller 3
Loin puller 4

This allows the operator to select any one of the four machines 10A-D.

Selection of Blade

THE PAGE 4 (FIG. 11D) at 192.168.2.76:800/LP1SEL.htm shows that if Loin puller 1 is selected in FIG. 11C, the operator is presented with the ability to select operation parameters for either the J- or Z-Blade, as well as which operating parameters. In this example, loin puller 10A (Loin puller 1) is selected. Choices for Lion puller 1 are:

Loinpuller 1 Blade Select
DEFAULT J SETTINGS
MEDIUM J SETTINGS
HEAVY J SETTINGS
VHEAVY J SETTINGS
DEFAULT AND MEDIUM Z SETTINGS
HEAVY AND VHEAVY Z SETTINGS The four choices for the J-Blade relate to pre-designed cutting profiles. One is simply a default J-Blade cutting position relative to amount of back fat typical on a carcass. Pre-sets for cuts deeper than "default" are medium, heavy, and very heavy, respectively incremental increases in cutting depth.

Similarly, the Z-Blade presents two choices (instead of four) namely "default and medium Z settings" and "heavy and very heavy Z settings"), respectively.

In this fashion, only a selected sub-sub-set of overall possible operating parameters of the loin puller are presented, and then, the number of choices from each blade are limited.

It is to be understood that the PAGES can have graphical features that can assist the operator in differentiating between options. For example, in FIG. 11D, the four J-Blade options could be one color of type font (e.g. red) and the two choices for the Z-Blade a different color (e.g. blue). This can help the operator more easily and quickly choose. Other graphical or sensory differentiators are, of course, possible, such are as known to those skilled in GUI, HMI, and similar interfaces. Examples include, but are not limited to, font size, font type, background grey scale or color, position on the display screen, icons, vibration or other tactile signals, or sound signals.

Display of Operating Parameters for Selected Blade with Ability to Modify them

Z-Blade

As illustrated at PAGE 5 (FIG. 11E), if the Z-Blade of loin puller 1 is selected in prior PAGES, and Blade 1 "default and medium settings" is selected in FIG. 11D, the operator is presented with a pre-selected sub-sub-set of Z-Blade operating parameters, as well as present settings for each. As shown in FIG. 11E (at IP address 192.168.2.76:800/LP1DZ.htm) those parameters and settings are:

| Operating parameter | Present value |
| --- | --- |
| Delay first up | 751 |
| Height first up | 200 |
| Second delay | 750 |
| Finger height | 0 |
| First drop delay | 500 |
| First drop end of loin | 241 |
| Delaybefore dive out | 190 |
| Second drop at end. | 300 |

The "present values" in the table above are known within the art. They are settings that rely on many variables to determine those settings. Examples are hydraulic pressure, hydraulic flow controls, conveyor speed, valve and cylinder wear, guides and bushing wear, and blade sharpness and position. Those skilled in the art are familiar with these things.

For context, the following is an example of such settings. A customer decides it needs the Z-blade to move up half an inch for six inches along the loin. The first loin pull or machine does this with the "present" set numbers being first to lay up 751 and first up height being 200 (see table above). The second loin puller is set for a 150 delay and 359 height to get the movement to be the same as the first puller.

The adjustments are very complex to get the most for a customer. Below is a simple example of how this works. Using the two settings from above, (first delay 751, and height first up 200), if the market changes and the loin is now worth more, or there are more loins sold so they need more loin weight, the customer may want more weight on loin. The values could be changed to 850 delay and 100 up. If a belly is worth more, it could be changed to 400 delay and 300 up. This would transfer millions of loins or bellies and increase the bottom line.

As can be seen by this example, the ability to adjust settings with the invention can represent a subtle but value-added feature to loin pulling.

Thus, the sub-sub-set of operating parameters puts in front of the operator, at or near the machine, a selected menu of critical operation parameters for loin puller operation. The operator can personally witness machine operation and, immediately, make informed adjustments of any of those operating parameters. This eliminates physically moving to the remote office to make the changes. Such could take minutes. It eliminates using radio or cell phone or other voice communication from a worker at the machine to a second worker in the remote office requesting an adjustment, which takes time and risks human error in the communication or an adjustment based on the communication.

J-Blade

An example of a similar display for the J-Blade is shown at FIG. 11F. This PAGE 6 for Loin puller 1 J-Blade Default Setting comprises (at IP address 192.168.2.76:800: LP1DJ.htm):

| Operating Parameter | Present Value |
| --- | --- |
| Delay initial up | 0 |
| Firs delay | 75 |
| First up | 0 |
| Second delay | 75 |
| Second up | 0 |
| Down delay | 50 |
| In delay | 200 |
| Out delay | 250 |

The table above gives one example of present values for the J-Blade. Like the Z-blade, the operator can use the invention to adjust the same and their function are well-known to those skilled in the art.

As can be seen, the tablet operator can have local immediate control of selected operating parameters of each and every loin puller machine, even though physically separated from the PLC that is controlling them.

Although the PLC can come originally with a web server, the improved system does not provide the operator with all possible information available at the PLC. For example, the web server allows diagnostics and other functions to be communicated via IP protocol. The present invention presents discrete sub-sets of operating parameters and ability to instruct adjustments, at the tablet 50.

In this way, the operator can quickly and efficiently make on the fly machine adjustments without having to cycle through non-relevant data.

D. Options and Alternatives

The foregoing exemplary embodiments are given by way of example and not limitations. Variations, including those obvious to those skilled in the art, will be included within the invention.

Some examples of possible variations are mentioned previously. Other examples are as follows.

The invention can be applied to other meat processing machines in analogous ways.

The specific adjustments and presentation of adjustment on the portable device can vary according to desire and need.

The particular portable device and the precise technique of wireless communication and protocol of communication can vary. Those skilled in the art are familiar with such options.

One example of generating an HMI via web browser is described at US 2011/0046754, which is incorporated by reference in its entirety. It can be applied to the PLC of a loin puller in the manners discussed above. I/O modules associated with the PLC are controlled by a web-based HMI. A client/server paradigm uses a web server, hypertext HTTP and web browsers. The browser makes a request via TCP/IP for files from an FTP server. The browser builds an HTTP request and sends it to the Internet Protocol (IP) address contained in or referenced by the URL. The web server responds by sending requested files or data which builds an HMI rendering via HTTP(s) at the browser on the tablet. Other techniques are possible.

The invention claimed is:
1. A method of controlling a set of loin pulling machines on the floor of a meat processing plant which are remotely controlled by a PLC comprising:
   a. web-enabling the PLC and providing the PLC with an IP address;
   b. connecting the web-enabled PLC to a wireless router,
   c. web-enabling a portable digital device with wireless capability, d. displaying on the portable device loin puller operating parameters from an overall set of loin puller operating parameters, e. allowing an operator at or near any of the loin pulling machines to select one of the machines, view the displayed operating parameters, and adjust one or more of the displayed operating parameters without leaving the floor of machines;

f. communicating any adjustments from the portable digital device to the PLC via a wireless communication path between the portable device and the router, g. so that the operator can manage critical operating parameters of any of the set of loin pulling machines from at or about the machines instead of at the remote PLC.

2. The method of claim 1 wherein the operating parameters relate to J and Z blades and comprise one or more of:

a. default, medium, heavy, and very heavy settings for the J blade, and default and medium, and heavy and very heavy settings for the Z blade;

b. Z blade delay first up, height first up, second Z delay, finger height, first drop delay, first drop end of loin, delay before dive out, and second drop at end;

c. J blade delay initial up, first delay, first up, second delay, second up, down delay, in delay, out delay; or d. all of the forgoing.

3. The method of claim 1 wherein the communication is via an IP address unique to the PLC.

4. The method of claim 3 wherein the communication is via an IP address unique to a port of the PLC.

5. The method of claim 1 wherein the portable digital device comprises a tablet computer which is web- and wireless-enabled.

6. The method of claim 1 wherein the digital device comprises a tablet computer, a smart phone, a lap top computer, or the like.

7. The method of claim 1 wherein the portable device controls plural loin pulling machines.

8. The method of claim 1 wherein an operator walks on a plant floor at the loin pulling machine(s) and the portable device communicates wireless to a remote office.

9. The method of claim 8 wherein the remote office is meters or tens of meters away.

10. The method of claim 1 wherein if the portable device ceases to operate or malfunctions, the PLCs maintain control of the loin pullers.

11. A method of adjusting operation of a meat processing machine on the floor of a meat processing plant which is controlled by a PLC away from the machine, comprising:

a. providing an operator at the meat processing machine a digital display of pre-selected operating parameters related to the meat processing machine;

b. allowing adjustment of one or more of the pre-selected operation parameters;

c. communicating any adjustments to the PLC; and d. allowing real-time control of a remotely positioned PLC to minimize need of operator to have to physically walk between machine and the PLC in a remote room.

12. The method of claim 11 wherein the digital display is on a web- and wireless-enabled tablet computer.

13. The method of claim 11 wherein the pre-selected operating parameters relate to Z and J-Blade adjustments at the machine.

14. The method of claim 13 wherein the blade adjustments relate to both temporal and spatial operations.

15. The method of claim 14 wherein:

a. the temporal operations relate to timing of when a blade is moved between positions; and b. the spatial adjustments related to amount of movement of a blade between positions.

16. A system of operating an automated loin machine on a meat processing floor includes a variety of components under control of a remote PLC that relate to loin pulling, comprising:

a. a PLC in a remote protected room or office having software and programmability to regulate the components by hardwire back at the loin puller machine;

b. a portable web-enabled digital device, such as a tablet computer, which includes wireless communication capability and can be used by an operator at and about the loin puller machine;

c. a wireless router operably connected at the PLC provides a wireless communications link to the portable device;

d. using IP protocol, the portable device can display to the operator a set of displays with specific control parameters;

e. the control parameters are selected to provide the operator with critical machine adjustments right at the loin puller;

f. the portable device allowing the same or similar control of all loin pullers on the floor from that single device.

17. The system of claim 16 further comprising a plurality of loin pullers, each with a PLC, and the portable device can control any of the plural loin pullers.

18. The system of claim 16 wherein the control parameters relate to Z and J-Blade adjustments.

19. The system of claim 18 wherein the blade adjustments relate to both temporal and spatial operations.

20. The system of claim 16 wherein:

a. the temporal operations relate to timing of when a blade is moved between positions; and b. the spatial adjustments related to amount of movement of a blade between positions.

* * * * *